United States Patent [19]

Moran et al.

[11] 3,916,699

[45] Nov. 4, 1975

[54] METHOD AND SYSTEM FOR VIBRATION TESTING OF OBJECTS

[75] Inventors: William P. Moran; Robert E. Fearon, both of Tulsa, Okla.

[73] Assignee: Resource Sciences, Corporation, Tulsa, Okla.

[22] Filed: Nov. 13, 1973

[21] Appl. No.: 415,314

Related U.S. Application Data

[63] Continuation-in-part of Ser. No. 309,114, Nov. 24, 1972, abandoned, which is a continuation of Ser. No. 172,168, Aug. 16, 1971, abandoned.

[52] U.S. Cl. ................................. 73/67.2; 73/67.6
[51] Int. Cl.² ...................................... G01N 29/00
[58] Field of Search ............... 73/67.2, 67.6, 67.5 R, 73/69, 71.5 R, 71.5 US

[56] References Cited
UNITED STATES PATENTS

| | | | |
|---|---|---|---|
| 3,411,344 | 11/1968 | Lloyd | 73/67.2 |
| 3,623,357 | 11/1971 | Abbotts | 73/67.2 X |
| 3,741,334 | 6/1973 | Kaule | 73/67.2 X |

*Primary Examiner*—Jerry W. Myracle
*Attorney, Agent, or Firm*—Richards, Harris & Medlock

[57] ABSTRACT

Acoustic waves are generated in an object to be tested by a distribution of stresses arranged to produce a banded vibration within the object. The characteristics of the banded vibrations and their interactions with the object are monitored at different locations on the object and used to determine properties of the object such as flaws and defects.

35 Claims, 51 Drawing Figures

INVENTORS:
WILLIAM P. MORAN
ROBERT E. FEARON

ATTORNEYS

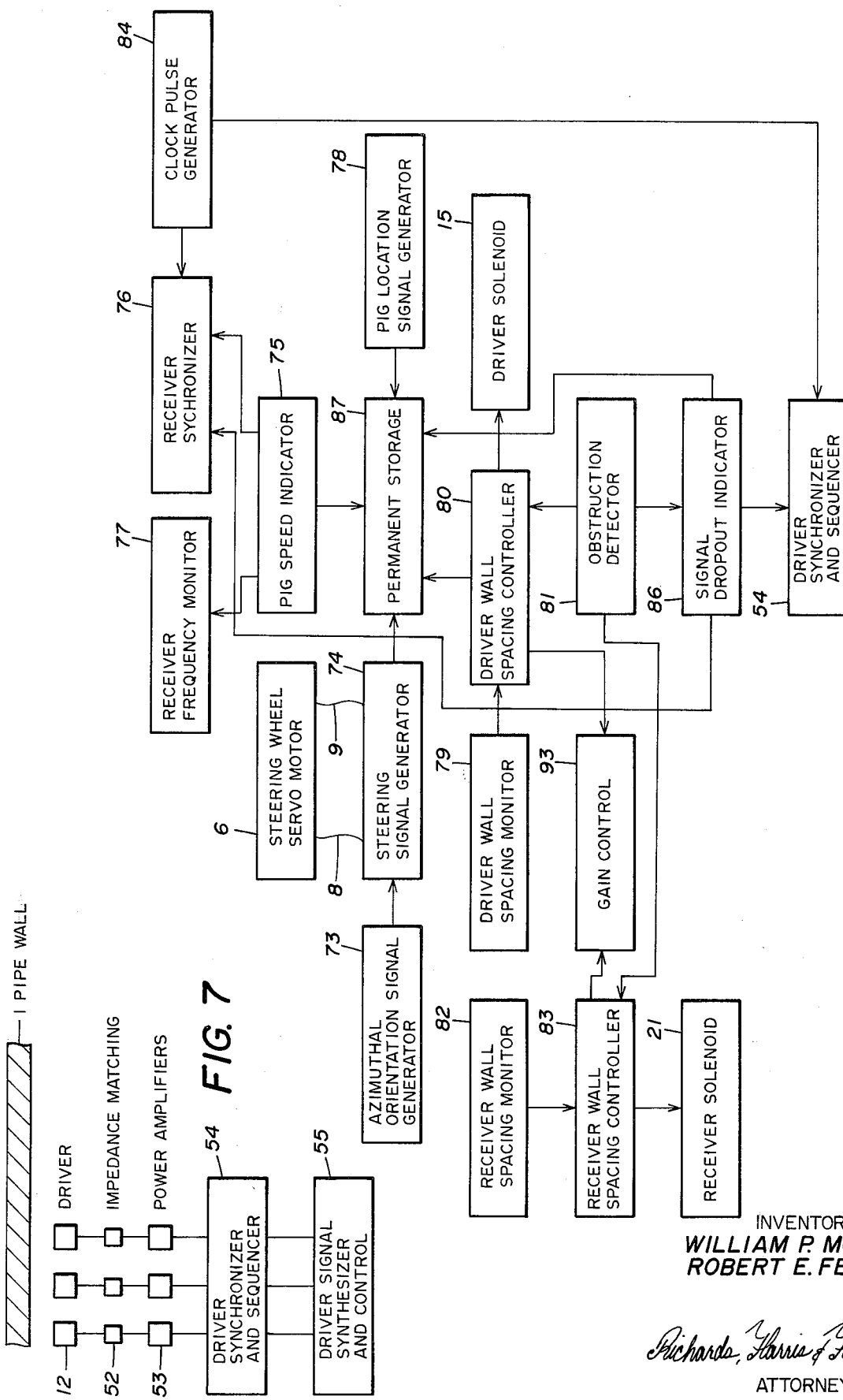

INVENTORS:
WILLIAM P. MORAN
ROBERT E. FEARON

Richards, Harris & Hubbard
ATTORNEYS

INVENTORS:
**WILLIAM P. MORAN
ROBERT E. FEARON**

*Richards, Harris & Hubbard*
ATTORNEYS

INVENTORS:
WILLIAM P. MORAN
ROBERT E. FEARON

ATTORNEYS

INVENTORS:
WILLIAM P. MORAN
ROBERT E. FEARON

ATTORNEYS

INVENTORS:
WILLIAM P. MORAN
ROBERT E. FEARON

ATTORNEYS

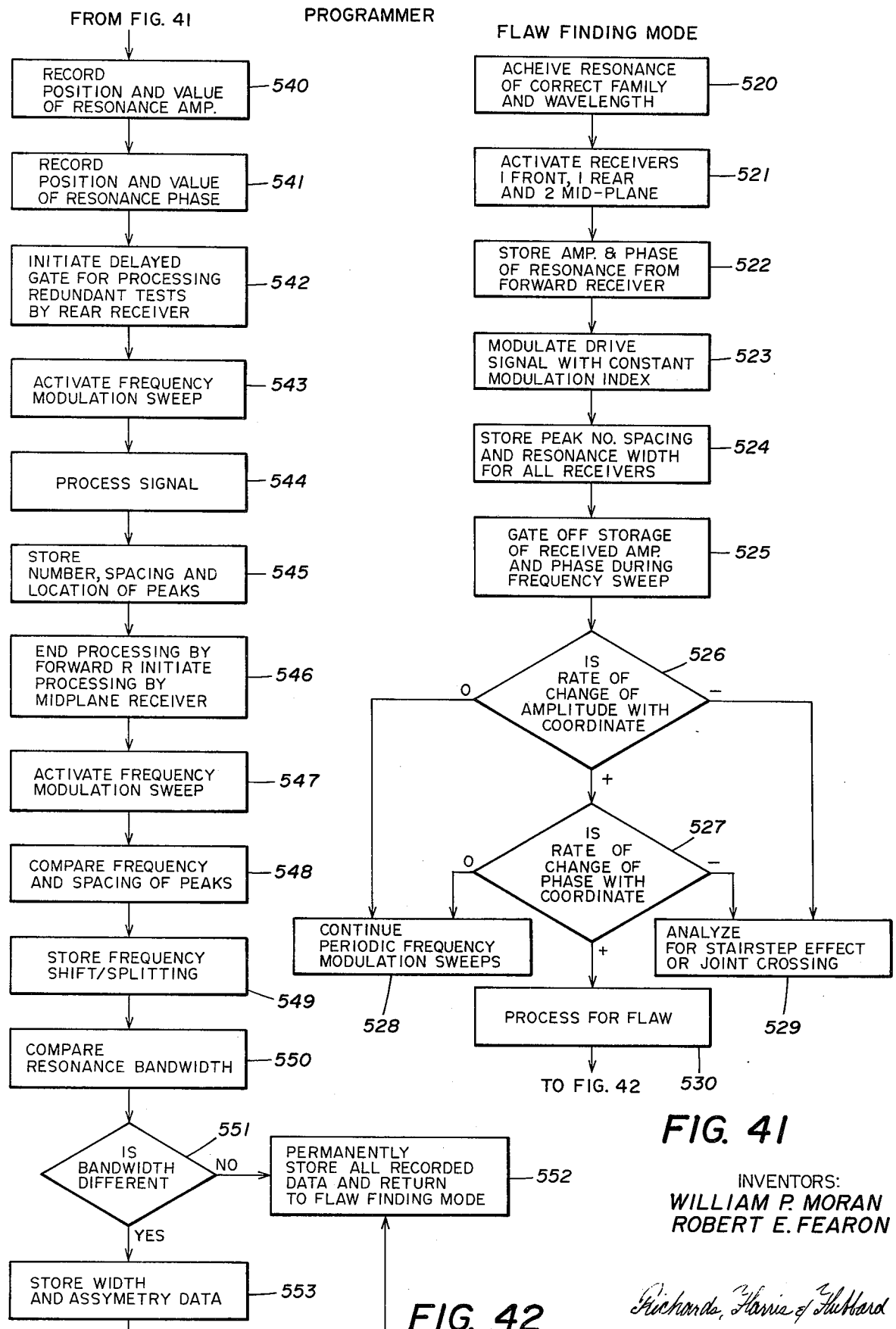

METHOD AND SYSTEM FOR VIBRATION TESTING OF OBJECTS

BACKGROUND OF THE INVENTION

This is a continuation-in-part of application Ser. No. 309,114, filed Nov. 24, 1972 now abandoned, which is a continuation of application Ser. No. 172,168, filed Aug. 16, 1971, now abandoned.

1. Field of the Invention

The invention relates to the acoustic testing and measurement of objects, and more particularly, to the generation of banded vibrations within an object to: (a) detect, measure, and identify flaws; (b) measure the size, shape, and method of construction of an object; (c) measure the parameters characterizing the useful and ultimate strength and other elastic and plastic characteristics of an object; and (d) measure the stress and strain conditions due to use and construction of an object.

2. History of the Prior Art

Devices have heretofore been used for measuring mechanical characteristics of a material as opposed to devices for detecting and/or measuring flaws. Many devices are capable of measuring both material characteristics and flaws with varying success under suitable changes in parameters or operation or display. Further devices have been used which utilize substantially continuous waves of a well defined frequency as opposed to those devices which intentionally terminate the wave trains to facilitate detecting echoes. Devices also have been used which utilize narrow beams directed in precisely chosen directions as opposed to those devices which fill some or all of the object with waves, the only restriction being the boundaries of the object under test. In other systems, resonance as a condition of the wave parameters has been employed, in contrast with those systems which do not utilize or require a resonance condition.

Other prior art devices have employed wave propagation at frequencies such that the bulk character of the material determines the propagation and the surfaces act only to reflect waves and change polarization of the wave. These devices are contrasted to those systems which relay on the presence of surfaces to determine the majority of the vibration distribution. Further, devices have been employed which make use of the same transducer for generating waves and for monitoring the response of the material as opposed to systems which utilize separate transducers for generating the wave and for monitoring the response of the material. Still other systems generate waves in an object by intimate contact with a generating transducer in contrast to systems in which the object and the generator are separated by a sound conducting medium.

Devices have also heretofore been used which rely on specimens of specially prepared size and/or shape as opposed to systems which work on the object in its "natural" or commercial configuration. Further, devices have been employed which utilize the reflective ability of an inhomogeneity in the material to create a change in the wave pattern and signal the presence of the inhomogeneity in contrast to systems which utilize the transmission ability of an inhomogeneity to create a change in the wave pattern which signals the presence of the inhomogeneity. Still other prior art devices utilize the polarization changing ability of an inhomogeneity in the material to create a change in the wave pattern and signal the presence of the inhomogeneity as opposed to those systems which utilize the reflection or transmission ability of an inhomogeneity to create such a change.

The measuring technique of certain prior art systems is directed toward stress levels sufficiently high to cause deviations from the linear elastic behavior of the material thereby involving the plastic character of the material and possibly causing non-linearities in the response of the material in contrast to systems which utilize power levels sufficiently small that the material is never appreciably outside of the linear elastic region of the stress-strain characteristic consequently measuring only the first order terms in the material's response to stress. Other prior systems rely upon the shape of the object under test for their utility rather than being capable of modification to be adapted to objects with no specific shape restrictions. Finally, systems have been used which measure the acoustic parameters of a material and detect flaws in the material without relying on the perfection of nearby regions of the material for a reference rather than require the perfection of some considerable portion of the object under test to provide a reference region for comparison purposes in interpretation.

A substantial amount of literature has been published relating to acoustic testing which reflects various attitudes toward the utility and feasibility of schemes for measuring elastic properties of materials and for measuring the sizes and shapes of objects and for detecting flaws in objects. With respect to flaw finding and size measurements, the pulse echo method, which utilizes short, broad spectrum pulses is currently much preferred to the continuous wave systems with narrow frequency spectra. Methods which rely on special transducer configurations to generate precisely directed beams are considered most useful. The majority of techniques used rely on mechanical scanning systems to explore large objects although phased-arrays of transducers are coming into use to allow electronic scanning of large volumes of material. Multiple transducers are a source of considerable difficulty in practice due to the strict requirements on the quality of acoustic impedance matching at the interfaces. Current continuous wave methods suffer from lack of sensitivity to flaws in certain orientations. The usefulness of certain types of wave propagation which are determined primarily by the presence of surfaces is greatly impaired by the need to match the phase of the wave on the surface of the object to the phase of the wave on the surface of the transducer. The usefulness of other types of wave propagation which are determined primarily by the presence of surfaces is also impaired by the inability to select which of several modes of propagation will be excited by a transducer. Both of these objections to the use of wave propagation governed primarily by surfaces are even more severe for the more popular pulse-echo systems than for continuous wave systems because both objections involve phenomena which are strongly frequency dependent.

In addition to the importance of precise control of the acoustic impedance at the interface between an object and a transducer in customary systems, a further condition on the control of this impedance is found in current continuous wave and resonance systems. Here the exact value of the phase delay across the interface enters in the interpretation of pulse echo or resonance measurements of distance or thickness. Also, the frequency dependence of the acoustic impedance further complicates interpretation by altering the group velocity and shape of pulses. Presently used flaw finding and measuring techniques utilize very little of the information which a wave propagating in a medium can convey about the medium. This under-utilization is primarily the result of the lack of control possible over the precise direction, wavelength, phasing, polarization, and velocity of waves which presently used transducers can excite in objects and also the result of the choices of operating frequency and other conditions forced on the user by the nature of the transducers and by the nature of the data processing and display.

The system of the present invention is superior in nearly every respect to prior art methods of measuring objects, measuring their elastic constants, measuring their mechanical condition under uses, and in detecting, identifying, and measuring a wide variety of flaws in the object. In many instances the present system represents a new classification of acoustic device, even in the single embodiment disclosed herein. The specification will point out some of the significant differences between the system of the invention and currently used systems.

SUMMARY OF THE INVENTION

The invention includes a system and method for producing and controlling a pattern of acoustic vibrations, herein called a banded vibration, in a sound conducting body which has at least one acoustic ray path closed upon itself and has a length normal to the direction of the path. An acoustic path which is closed upon itself is defined herein as a path for a wave which brings the wave back to the source without requiring reflection from a free surface. Reflection is not forbidden but it is not required either. The path length may be short, i.e. only a few wavelengths of the wave, or very long, i.e. many wavelengths of the wave. Stresses are applied to the body in at least one region along the path at a frequency corresponding with at least one banded vibration with respect to propagation of energy along the path and for a period substantially greater than the propagation period of the energy over the length of the path in the body and the vibration of the body resulting from energy flow along the path is sensed.

BRIEF DESCRIPTION OF THE DRAWINGS

For a more complete understanding of the present invention and for further objects and advantages thereof, reference may now be had to the following description taken in conjunction with the accompanying drawings in which:

FIG. 7 is a block diagram of the acoustic driving circuitry of the pig constructed according to the invention;

FIG. 10 is a block diagram of the control circuitry of the pig constructed in accordance with the invention;

FIG. 28 is a graph of the bell-shaped amplitude response to banded vibrations of a longitudinally seamed uncoated pipe while

FIGS. 35a and 36a illustrate amplitude versus frequency graphs for unflawed pipes while

FIGS. 41 and 42 are operational flow charts for the system of this invention in a flaw-finding and analyzing mode of operation.

DETAILED DESCRIPTION

Figure 1:
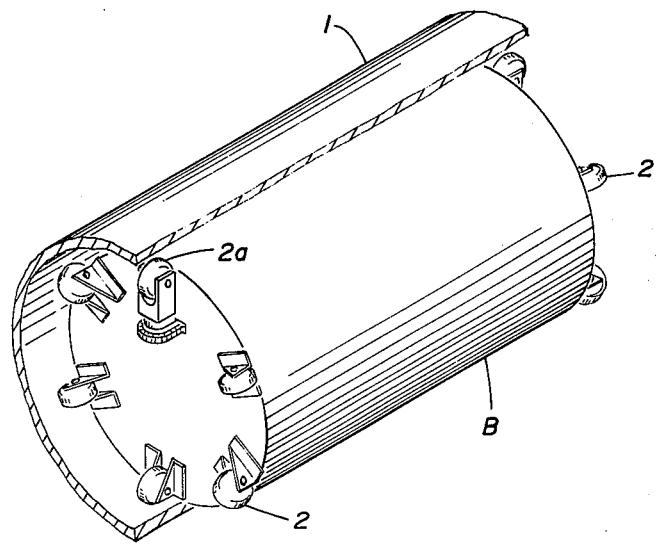
FIG. 1 is a perspective view of one embodiment of a pig constructed in accordance with the invention for mechanically testing pipe and shown within a cut away section of pipe.

The present invention includes the discovery of a novel type of acoustic vibration pattern which has a plurality of applications, one of which is in mechanically testing objects. The banded vibration pattern is particularly useful because of its well-defined identity in terms of measurable parameters. Banded vibrations possess many characteristics which are systematically predictable and permit ready measurement of any changes in those characteristics due to flaws, defects, stresses or past stresses in the material under test.

Another feature of banded vibrations is that the energy of which they are comprised has a very good signal-to-noise ratio and the amplitude of the vibrations at the banded resonance is very large, hence they have particular utility in applications such as communications. While the only embodiment of the invention described in detail in the present application is that of mechanical testing of elongated objects, banded vibrations have many other practical applications such as in the analysis of electrical signals, the filtering of wave forms, and as a frequency mixer wherein banded vibrations of one frequency interact with other electromagnetic or acoustic waves of the same or different frequencies to produce modulation or demodulation.

One characteristic of banded vibrations is that the banded resonance needs no reflecting boundary; that is, there is a great preference of the banded acoustic energy to propagate in a single direction and along a path within an object which closes upon itself, the banded vibrations may be localized and sustained within the object with very little loss. The banded vibrations are somewhat analogous to the characteristics of an optical laser in which light energy travels along a path which is essentially unbounded in two directions, but differs significantly in not requiring reflection. The banded vibration technique is novel in that the driver itself acts in a way analogous to an active lens. The driver action is active in the sense that it is a source of energy and it is a lens in the sense of concentrating the wave energy in one direction. Another characteristic of banded vibrations is that they are extremely low loss vibrations and hence do not require the addition of a substantial amount of energy to sustain the vibrations over an extended period of time.

The banded vibration technique of the present invention serves to measure the mechanical characteristics of a material and how the characteristics vary with use or past use of the object as well as to detect, identify, and measure flaws or other inhomogeneities of the material. Neigher the present system nor the data processing or data display require modification in order to perform these different functions. Further, it is unnecessary to substantially alter the conditions of operation of the system to accomplish these several tasks.

The banded vibration technique of the present invention utilizes substantially continuous waves of a well-defined frequency or set of frequencies. There is some utility in considering the use of pulses of waves instead of substantially continuous waves in the present technique. However, such is not specifically disclosed herein. The present banded vibration method utilizes a type and condition of wave propagation which establishes a predictable pattern of vibration in a controlled volume of a material. The method is free of any restrictions on the transducer design required to direct the beam toward or away from certain sections of a test object. Further, the present system utilizes resonance conditions in the wave parameters to establish a vibration pattern with predictable properties. This technique differs from all other resonance techniques in that the condition of resonance is established without necessitating reflection of the wave from a boundary. A resonance condition is established without requiring the transducer to emit energy into the object in a specified direction and without requiring boundaries in one coordinate perpendicular to the path of the resonant wave.

Banded resonances are established by the present technique in such a way that the entire volume of the object is set into a known vibration pattern. This is not to say that the pattern is uniform but to say that the distribution of vibration over substantially the whole object is known once resonance is established. This is in marked contrast to customary resonance and pulse techniques wherein only a very limited sample of a material is in a known vibration condition. In prior art acoustic techniques, signals from portions of an object adjacent to an area in the acoustic path are treated as noise or are uninterpretable. The lack of control over the vibration patterns in these techniques significantly reduces their usefulness by increasing the complexity of the data with attendant complications in data processing and interpretation.

Although both banded vibration resonance and customary resonance are processes that involve taking part of a wave and superimposing it many times on other parts of the same wave, banded vibrations also require that the wave propagate back into or near the region of wave excitation. Thus, not every resonance situation corresponds to banded vibrations. A further distinction between banded vibration and customary resonance is that the former makes use of a "mode conversion" process which selectively influences off axis propagation when the wave is brought back through the zone of excitation on successive traversals of the re-entrant path.

Another important distinction between the process of creating a banded vibration and customary resonance is that the band formation factors are operative whether or not the independent variables are chosen to correspond to a banded vibration resonance. That is, banded vibration can be established even though not at the resonance frequency. Banded vibration factors act to control the form of the amplitude distribution both in the direction of the band and in the direction of movement of the band. That is, both parallel to the wave propagation direction and perpendicular to it. Customary resonance only controls the vibration pattern in the direction of propagation of the wave to create a standing sinusoidal distribution composed of counter-traveling sine waves of the properly chosen resonance frequency. Banded vibrations, on the other hand, can be formed of waves all traveling in one direction, for example, in a reentrant path around a cylinder. A customary resonance consisting of a pure standing wave cannot be formed under such circumstances.

The band vibration technique of the invention is applicable at wavelengths at which both the bulk and surface properties of the object govern the propagation characteristics of the acoustic waves. The technique does not rely on the presence of reflecting boundaries, but could utilize such boundaries in other embodiments of the invention.

The system of the invention includes embodiments having separate generators and monitors and a significant feature of the system is that the banded vibration patterns are so well defined that several generators and/or monitors can be utilized simultaneously, with predictable results, on the same or different portions of the object under the influence of the same or different banded vibrations.

In prior art the impedance matching between the object under test and the transducer is a critical requirement. The match must be good and well controlled so that energy may be efficiently exchanged between the object and the transducers. In the banded vibration technique the coupling of the driver to the object is critical both for reasons of efficiency and for the need to produce mode conversion. The distribution of stresses on the object's surface and within its bulk due to surface and body forces from the driver determines the amount and kind of mode conversion occurring when the waves re-enter the driver zone. A considerable portion of the art of practicing the banded vibration technique lies in the control of surface and body stresses with the object of efficient wave generation and efficient mode conversion. The transducer shown in this embodiment has a distribution of stresses, electromagnetic, which performs both wave generation and mode conversion tasks. The electromagnetic transducer generates both surface and body stresses on the pipe wall. A distinct advantage to this kind of transducer is that the impedance match to the pipe wall does not depend upon the perfection of mechanical contact between the transducer and the driver object. In fact, the electromagnetic transducer need not contact the object at all. Maintaining good mechanical contact between driver and test object is a problem which plagues methods using mechanical strain in the driver to impart stresses to the test piece by contact. This is not to say that the banded method can not use mechanical contacting drivers. Also it is expected that the essential mode conversion process can be accomplished by either surface or body stresses or a combination of both.

The banded vibration technique of the invention does not require but certainly does not forbid the use of specially prepared samples of the material for testing and measurement. In the principal embodiment of the invention described herein banded vibrations are used to test and measure pipe, either while the pipe is in individual segments above ground or while the pipes are welded end to end below the ground.

The banded vibration technique differs from other prior art reflection and transmission measuring and flaw finding techniques because the latter are essentially time of flight measurements. This is one of the reasons banded vibrations are responsive to flaws and changes in the conditions of an object in a much more detailed way than systems based on reflection from a flaw. Both the prior art techniques of pulse echoing and resonance rely on the production of alterations in the time of travel of waves as an indication of changes in the propagation characteristics along the wave path. These techniques are only crudely sensitive to other aspects of the interaction of a flaw with vibrational waves, such as the amplitude of the returned flaw related signal while banded vibrations are responsive to essentially all of the modes of interaction between a wave and a flaw and between a wave and the object as a whole. Several distinct methods of flaw findings are displayed in the present embodiment of the invention and illustrate some of the variety of responses which are possible with banded vibrations. The use of banded vibrations provides many distinct measurable quantities each of which are related in an individual way to the size, shape, material, mechanical condition, perfection and environment of an object. Intercomparison of these measurable quantities or comparison of them to theoretical or empirical references yield many distinct types of information which can be deduced about the object, its conditions of use, its environment and its perfection. In contrast, customary acoustic techniques are capable of controlling and measuring only one type of independent variable so that the number of distinct types of measurements is limited. The predictability of the behaviour of several observables, as functions of the several controllable independent variables, is responsible for the large number and variety of distinct properties of an object which can be measured using banded vibrations. This same predictability and control of variables is responsible for the ease with which the technique of the invention can be automated so that numerous types of measurements and tests can be made without a need for operator intervention. In addition, the predictability and control of measurable parameters also insures that the data collected can be made suitable for automatic data processing without requiring a substantial amount of human intervention.

Most prior art acoustic methods of testing and measurement ignore many of the interactions between vibrational waves and the test object and between waves and the environment or flaws. Moreover, the operation of most customary acoustic methods are greatly impaired unless all other interactions except simple reflection or transmission effects on the time of transit of the wave are not suppressed to a high degree.

On the other hand, the excellent predictability of banded vibration response makes use of data which is unanalyzable with customary instruments. For example, the non-linear aspects of the response of a material to acoustic energy is favored because of the low attenuation of the waves employed. These non-linearities arise when the levels of the induced stresses are on the order of the elastic limits of the material and depend upon the second and higher order elastic constants of the material. In a system operating at normal or moderately large stress magnitudes, customary acoustic techniques are not sufficiently sensitive or well controlled to measure these non-linear effects. Further, customary measurement techniques include uncertainties in their measurements which are generally greater than the size of these non-linear effects. By virtue of their sensitivity, low attenuation, variety of distinct measurements, predictability and detailed nature of the banded vibration these phenomena are well suited to the observation and measurement of linear elastic, non-linear elastic, and plastic behavior of materials under either static or dynamic stresses.

The banded vibration technique of the present embodiment of the invention utilizes the characteristics of hollow right cylinders in defining the families of vibrations which are possible, the details of the band formation and the conditions for resonance. In other embodiments of the invention, banded vibrations can be established in objects having shapes and sizes other than those disclosed herein. For example, it is believed that banded vibrations can be generated in objects which are: (a) non-uniform in cross-section; (b) not hollow; (c) bounded by edges; (d) multiply connected with more than one cavity; and (e) non-uniform in composition.

The banded vibration technique of the present invention is capable of inspecting an object for many different characteristics. As has been pointed out above, these include measurement of the size and shape and method of construction of an object, measurement of parameters characterizing the useful and ultimate strength and other elastic and plastic characteristics of an object, to measure the stress conditions due to use and manufacture of the object and to detect, measure and identify flaws in an object. Although the technique of the present invention is responsive to many of the different mechanical characteristics of an object, the term "flaw" is used in several instances herein to include a deviation from the normal or expected characteristics of the object being inspected.

Banded vibrations have the feature that many quantities are measurable in an absolute sense. Several types of measurements yield information about the mechanical condition of an object without relying on an assumed zone of perfection in the object for reference. In contrast, customary acoustic measurements and flaw detection usually are completed by utilizing the object under test as the calibration standard.

The present embodiment of the banded vibration technique utilizes Lamb waves, a type which has previously had limited utility. The waves are used in the production of a resonance on an acoustically transmitting path closed upon itself and which is produced in a well-defined band determined by the choice of object size and shape and the number of characteristics of the wave generating transducers. While the Lamb waves are employed in the present embodiment, the banded vibration technique can be applied to wave propagation other than Lamb and acoustic waves and greatly extends an operator's control over the details of the propagation of those waves.

In order to establish banded vibration resonance, acoustic energy is produced by a transducer operating at a resonant frequency of a banded vibration which is not the resonant frequency of the entire mass being stimulated. The occurrence of a banded vibration rather than a customary resonance is somewhat dependent on the size and shape of the zone or zones of excitation and on the relative phase of driving forces if exerted at more than one point. Further, the occurrence of banded vibrations is controlled by the choice of operating frequencies in a manner which is dependent upon the dimensions and material of the object.

In order to generate banded vibrations, a driving force must be applied for sufficient time for the waves to make many complete traversals of the closed path. Typically, this may be from 50 to several hundred traversals. One advantage of using Lamb waves is that there are certain Lamb wave families for which the phase velocity is much larger than the bulk velocity. Using these waves, the waiting time for a band to form will not hamper rapid inspection even of large objects. Resonance is customarily a characteristic of the sharp reflecting boundaries within an object. However, in banded vibrations sharp boundaries may be present but they are not required and bandedness may be established even within the circumference of a solid cylindrical object such as a rod. It has been found that different modes of banded vibrations may extend to different depths within the surface of an object and hence by selecting the proper mode various depths of the material may be examined.

Banded vibrations have been found to exist in the form of different families. That is, for a given object, a family of banded vibrations has common characteristics such as related polarization of particle motion within the object; related distribution of vibrational amplitude as a function of the thickness of the material; and related depth to which the particular vibrations extend into the surface of the material. Each family is primarily characterized by the relation of phase velocity to frequency. Excitation or detection of a particular family is favored by certain design characteristics of the driving and receiving transducers.

In a particular application within which the present invention is shown embodied, that of mechanically testing an object, there are a number of different parameters of the banded vibrations, and changes therein, which may be measured to indicate physical characteristics of the object, such as flaws. For example, when banded vibrations are established within a closed path through an object, monitoring those vibrations with a receiver will indicate the same frequency as that being excited if there are no defects present in the object. If there is a flaw located within the closed path, however, analysis of the received frequencies of the banded vibrations may show the absence of a particular frequency or the presence of frequencies not being stimulated by the driver. Further, it is possible to change the frequencies of the driving energy and monitor the change in received frequency or the shift in phase between the driver and the receiver as indications of defects. In other embodiments, non-linear behavior of the material may be caused or utilized as a means of testing.

The particular embodiment of the invention disclosed in the present application is that of employing banded vibrations to inspect and test elongated objects such as metal pipes used in fluid transmission. In the manufacture of pipe, it is not uncommon for defects to occur such as small flaws and perturbation within the wall of the pipe and, further, when sections of pipe are welded together to form a pipeline, it is very easy for defects in the welds to occur which can go entirely undetected by the naked eye. Additionally, a pipeline may deteriorate due to rust or physical damage after the pipeline has been placed in service and the allowable stress in the pipeline may change over a period of use.

To inspect and test a pipeline for mechanical strength, stress levels, and flaws by utilizing the zone of sensitivity characteristic of banded vibrations, it is only necessary to move the testing equipment along the longitudinal axis of the pipe. Banded vibration tests may be made from either the inside or the outside of a pipe. A pig is a device which is commonly used in the pipeline industry for performing operations on the inside of a pipeline. A pig is propelled down the inside of a pipeline by the pressure of the fluid flowing through the line. In one embodiment of the invention the banded vibration test equipment is mounted in a pig to inspect a pipeline as it is propelled through the pipe. Because of the nature of banded vibrations a longitudinal section of the full circumference of a pipe is inspected at each instant of the test pig's passage through the pipe.

In the present embodiment of the pipeline inspection system employing banded vibrations the pig is placed in and moved along a pipeline to generate a traveling banded vibration which is continually monitored by receiving equipment within the pig and which produces an indication of the condition of the pipe. The pig may be equipped to relay information directly to read-out equipment giving mechanical condition of the pipe and the location and nature of any flaws or it may be equipped with recording equipment for storing information gathered by the pig as it travels along the pipe. The information can be later analyzed and used to locate flaws and objects along the length of the pipeline through which the pig traveled.

In disclosing the present embodiment of the invention, the physical construction and operation of the pig will be described first. Next, the theory and purpose of testing with banded vibrations will be discussed and, finally, test results and data interpretation along with examples will be described.

THE SONIC PIG

Referring to FIG. 1, there is shown a cutaway view of the pig in place within a section of a pipeline 1 which is to be mechanically inspected. The pig comprises a generally cylindrical body B having wheels 2 which support and guide the pig as it is moved along through the pipe 1. As is further shown in the side cross-section and end views of FIGS. 2 and 3, respectively, one of the wheels 2A is mounted upon a rotating support 3 which allows the wheel to turn about an axis perpendicular to the longitudinal axis of the pipe under control of a servo motor 6. The motor is connected to the wheel 2A through a pair of sprockets 4 and 7 and a chain 5. The rotating support 3 is mounted to the rigid body of the pig by a bracket 25. Power is supplied to the servo motor through control circuitry (described below) and a pair of leads 8 and 9. The rotating support 3 of the wheel 2A permits the wheel to be steered so that the azimuthal orientation within the pipe 1 can be changed. This is to avoid any orientation which might cause spurious readings due to the proximity of a driver 12, a receiver 37, or of nodes or anti-nodes of banded vibrations to some feature of the pipe wall such as joints or seams.

Figure 4:
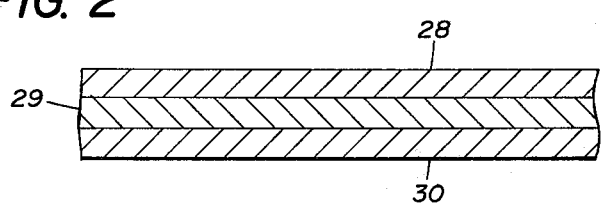
FIG. 4 is a cross-section view of a portion of the outer skin of the pig shown in FIG. 1.

The pig includes a multi-layer skin 10, best shown in the cross-section of FIG. 4, which shields the inside from both magnetic and acoustic vibrations. The skin 10 comprises a rigid non-conducting supporting layer 28, an acoustic damping layer 29 which absorbs vibrational energy to decouple the various vibration sensitive devices within the pig from the sources of vibrational energy, and a ferromagnetic shield 30 of the sprayed-on ferrite type which absorbs stray fields from the drivers and from currents induced in the pig structure and the pipe wall.

Referring again to FIG. 2, the skin 10 of the pig includes openings 11 through which an acoustic driver 12 may be presented to the wall of the pipe 1. Such openings are not necessary in all embodiments of the pig because certain transmitters can function adequately through one or more layers of the skin. In the particular embodiment of the sonic pig shown in FIG. 2, there are at least two drivers for exciting mechanical, acoustic vibrations within the pipe wall. Various drivers may be employed with different designs for different purposes related to flaw finding and other monitoring operations of the equipment. The character 13 identifies a gap between the driver and the pipe wall which permits a rapid cursive survey of the pipe surface and is not hampered by minor irregularities in the pipe surface.

Each support for a driver 12 is comprised of a ferromagnetic core 14 and an electromagnetic coil 15 which together make up a solenoid which exerts a force on the driver 12 pulling it against a spring 16 which opposes the motion of the driver away from the pipe wall. The solenoid and the spring 16 maintain a substantially constant gap 13 which is under control of gap monitoring circuitry (described below). One of the functions of the solenoid is to raise the driver 12 clear of any obstructions which may be detected on the surface of the pipe and which might impede the pig's progress down the pipe 1. The solenoid and spring 16 are fixed to a support 17 which serves to isolate the driver 12 from the body of the pig. The material of which the support 17 is made may be an acoustic absorbant such as fiber-filled plastics of the epoxy family. The acoustic absorbing support 17 prevents any modulation of drive signal strength, frequency or phase due to modulation of the presentation of the driver to the pipe wall.

The pig also includes a plurality of receivers 37 which are brought adjacent to the surface of the pipe 1 through openings 19 in the skin of the pig. As with the transmitters 12, these openings 19 are often not necessary in certain embodiments. Character 20 identifies the gap between the face of the receiver 37 and the pipe wall.

Each support for a receiver 37 comprises a solenoid including a ferromagnetic core 22 about which is wound an electromagnetic coil 21. As is in the case of the driver 12, the receiver 37 is biased toward the wall of the pipe by a spring 23. The gap, identified by character 20, between the wall of the pipe and the receiver 37 is controlled so that in the event of any upcoming obstruction in the path of the receiver, the receiver may be raised to avoid damage.

Figure 2:
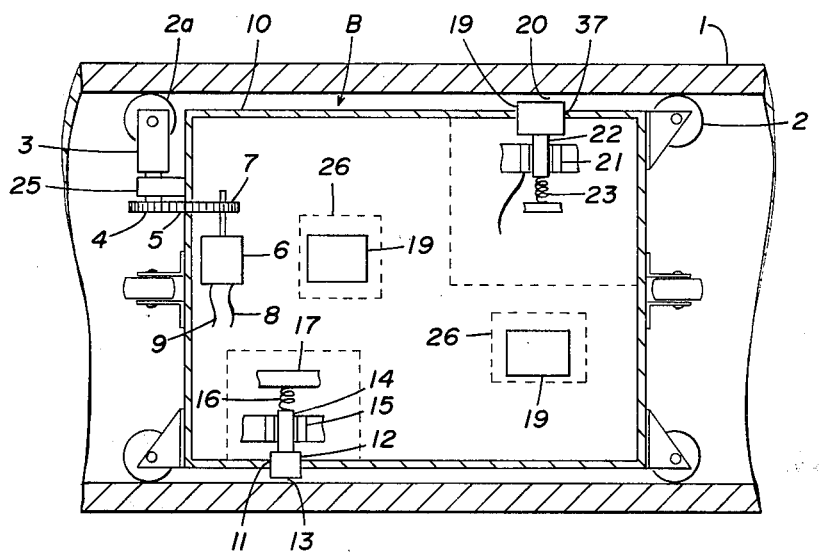
FIG. 2 is a cross-section view of the pig of FIG. 1.
Figure 3:
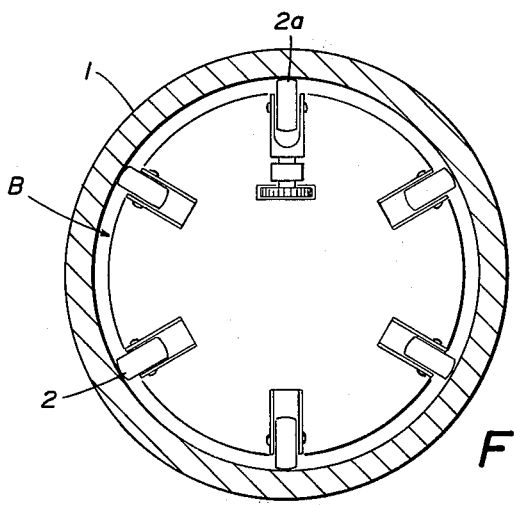
FIG. 3 is a front end view of the pig shown in FIG. 1.

There are several receivers and drivers located at different points within the pig, only one of each are shown in FIG. 2. Preferably, the pig contains at least four receivers, one near the front, two near the mid-plane and one at the rear. The front, rear and one of the center receivers lie on a common line parallel to the axis of the pipe and are equally spaced from one another. The other middle receiver is spaced azimuthally from the first to permit wavelength, phase and mode measurements. Each driver 12 and receiver 37, as well as other sensitive electronic components, are surrounded by a shield 26. The shield comprises layers of electrostatic, electromagnetic, and acoustic damping material which is somewhat similar to the skin 10 of the pig and the acoustically damped support member 17. Obstruction detectors (not shown) are located in the front of both drivers 12 and receivers 37 to prevent damage by contact with obstructions.

Figure 5A:
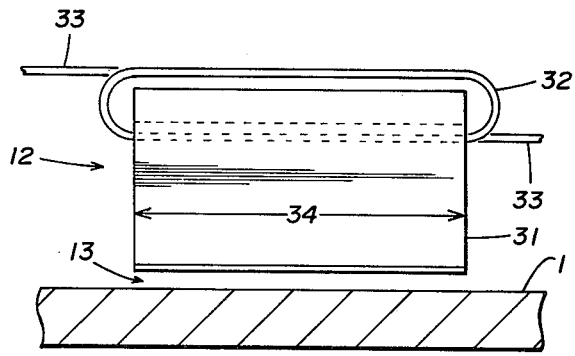
FIG. 5A is a side view of a transmitter for inducing acoustic vibrations into a pipe for testing in accordance with the invention.
Figure 5B:
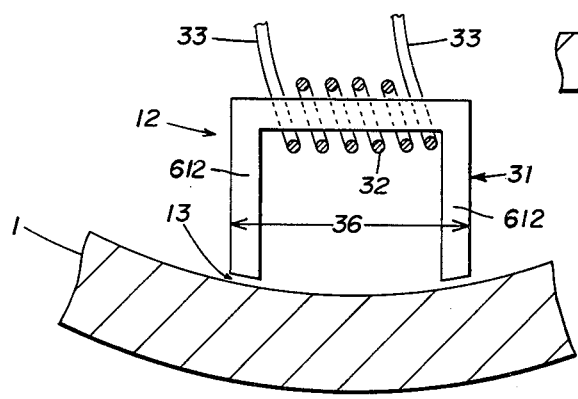
FIG. 5B is a front view of the acoustic electro magnetic driver transmitter shown in FIG. 5A.
Figure 5C:
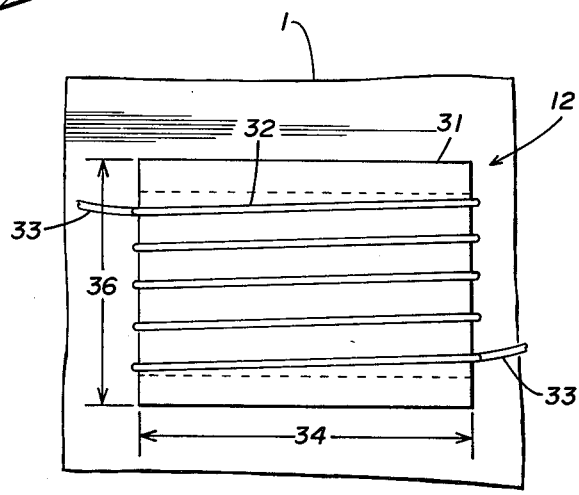
FIG. 5C is a top view of the apparatus shown in FIG. 5A.

Referring now to FIGS. 5A, 5B and 5c, there is shown front, side and top views, respectively, of one of the drivers 12. The driver shown is of the ferromagnetic, non-contacting, magnetically coupled type but many other types of drivers could be used in the invention. Each of the drivers 12 comprises a magnetic exciter including a core 31 comprised of standard high frequency ferromagnetic material having a coil 32 of heavy gauge copper conductor, the end leads 33 of which extend to a driving power amplifier. The pole pieces of the driver 12 are separated from the pipe wall by a spaced distance, denoted by the character 13, and extend for a short direction along the longitudinal axis of the pipe 1. The length of the driver core in the direction of the pipe axis denoted by character 34, as well as the spacing of the driver legs 36, and the thickness of the driver legs 612, and the number of driver legs are particularly related to the efficiency of mode conversion. Both the width and shape of the banded resonance, as well as the family and wavelength of the vibrations are partially determined by these dimensions. In one embodiment designed for testing a steel pipe having an 8 inch inside diameter and wall thickness approximately one-fourth inch at a mechanical vibration frequency on the order of 200 KHz, a core width of approximately 1 inch and a core length of approximately 2 inches and a leg thickness of about one-fourth inch produces a banded vibration having an extent of approximately 6–10 inches along the longitudinal axis of the pipe centered at the location of the driver center. In other embodiments of the invention, these dimensions may be altered and the driver core may be other than rectangular.

Figure 6A:
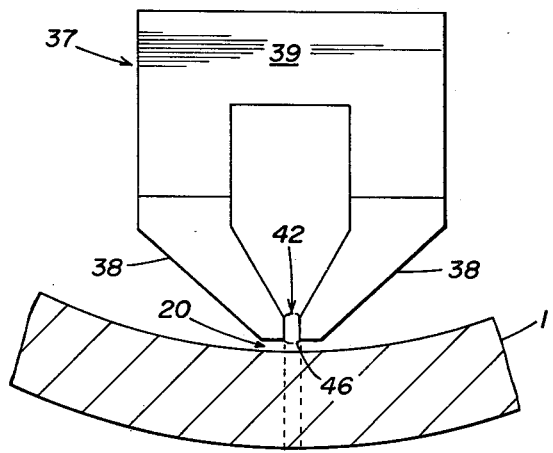
FIG. 6A is a front view of an acoustic receiver for monitoring vibrations of a pipe for testing in accordance with the invention.
Figure 6B:
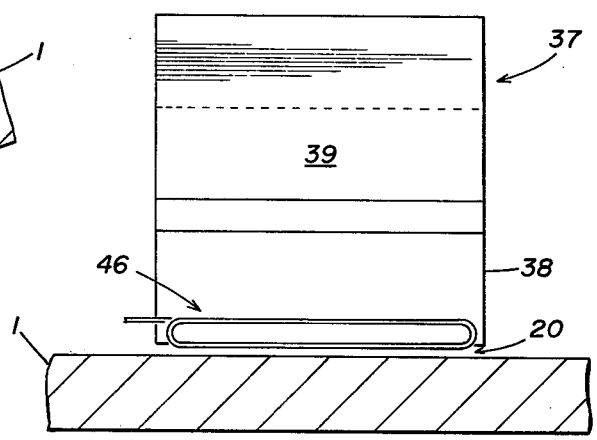
FIG. 6B is a side view of the acoustic receiver shown in FIG. 6A.

FIGS. 6A and 6B illustrate a front and side view, respectively, of one embodiment of a receiver 37 which has been found effective in the present invention. The receiver 37 comprises a ferromagnetic pole tip 38 which is pear-shaped to carry the magnetic flux of a permanent magnet 39. The pole tip 38 of the receiver 37 carries flux in a low reluctance path from the region of the receiver pipe wall gap (denoted by character 20) and the pole-to-pole gap (denoted by character 42). The only critical dimension in the receiver is that of the pole-to-pole gap 42 which is related to the spatial resolution of the receiver. For frequencies up to 250 KHz in steel pipe, a pole-to-pole gap of about one-sixteenth inch is satisfactory and the distance between the tips of the poles and the wall of the pipe 20 may be on the order of one thirty-second inch. The receiver 37 includes a pickup coil 46 comprising approximately 50 turns of No. 36 copper insulated wire for operation at frequencies up to about 250 KHz. The coil 46 can be placed at other points in the magnetic path formed by the magnet 39, the pole tips 38 and the pipe wall 1. For example, the receiver pickup coil 46 may be placed in a gap created between the magnet 39 and the poles 38 or wound about the poles or the magnet itself. The leads from the receiver 37 extend to the input of an amplifier.

Referring briefly now to FIG. 7, a power amplifier 53 is coupled to each one of the drivers 12 by an impedance matching circuit 52. A driver sequencer and synchronizer circuit 54 is used to determine the operative state of the pig, the state of the data currently being taken, the state of the data in temporary storage as well as to control the number, kind, position and order of the drivers to be operated. The sequencer and synchronizer 54 also route the signals from the various drive signal controllers to a driver signal synthesizer 55 to activate the wall spacing monitors and determine which drivers are in their operating condition relative to the pipe wall. Various modes of operation of the system to be specified by the sequencer and synchronizer 54 are as follows:

Mode A — This is a search and identifying mode and is used for initiating operation in each new joint of pipe, at the beginning of a logging operation, and in the event there is a signal dropout such as might be caused by an obstruction of the pipe wall or if the mechanical condition so changes that the signal changes beyond the search limits of the other modes of operation in which the pig may be operated. This mode establishes banded vibrations of a certain family and mode number.

MODE B — Uses banded vibrations of a certain family and mode number to search for flaws by the resonance splitting technique.

MODE C — Uses banded vibrations of a certain family and mode number to search for flaws by the phase shift method.

MODE D — Uses banded vibrations of a certain family and mode number to search for flaws by the energy surplus-deficiency method.

Each of these modes are utilized by any or all of the receiver processors in various orders and at various times. Each of these modes generates data related to the mechanical condition of the pipe such as its elastic character and to the conditions of its use such as internal and external stresses. Modes B, C and D are only examples of the many types of flaw sensitive measurements which can be made with this single arrangement of equipment.

Figure 8:
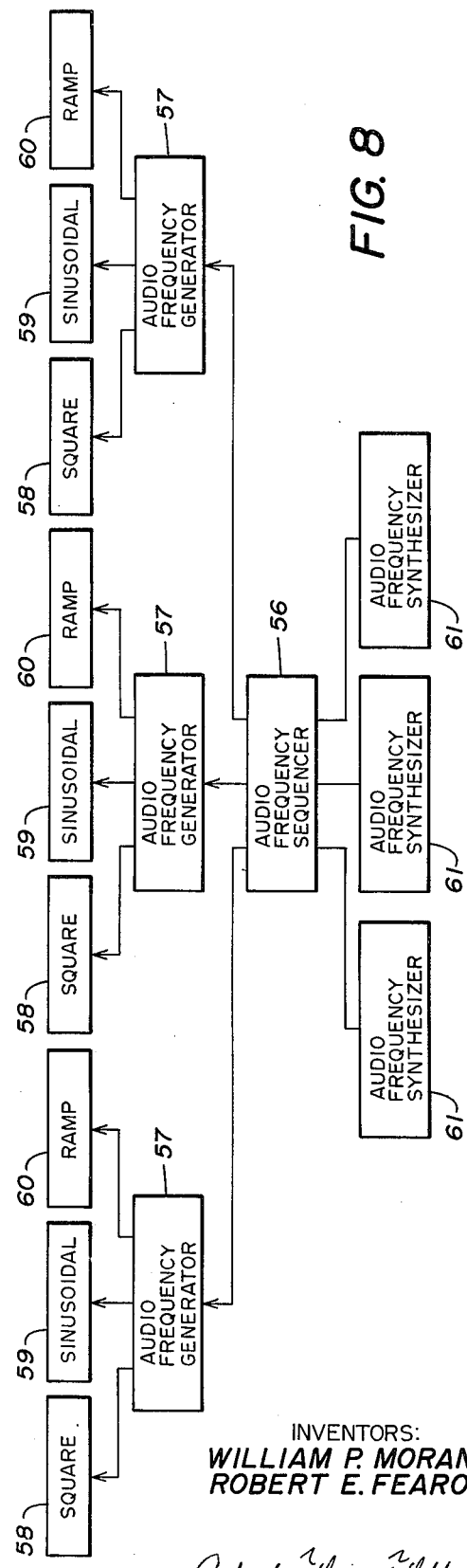
FIG. 8 is a block diagram of the acoustic signal generating circuitry of the invention.

Referring now to FIG. 8, the control equipment for the electronics within the pig includes a sequencer 56 which controls the routing and timing of audio frequency signals produced by a plurality of audio generators 57. The audio generators feed a plurality of square wave shapers 58, sinusoidal wave shapers 59, and linear time function shapers 60. A plurality of audio frequency synthesizers 61 control the amplitude and frequency of the audio signals produced by the generators 57 in response to inputs from the other components of the pig and as a function of the selected mode of operation.

Figure 9:
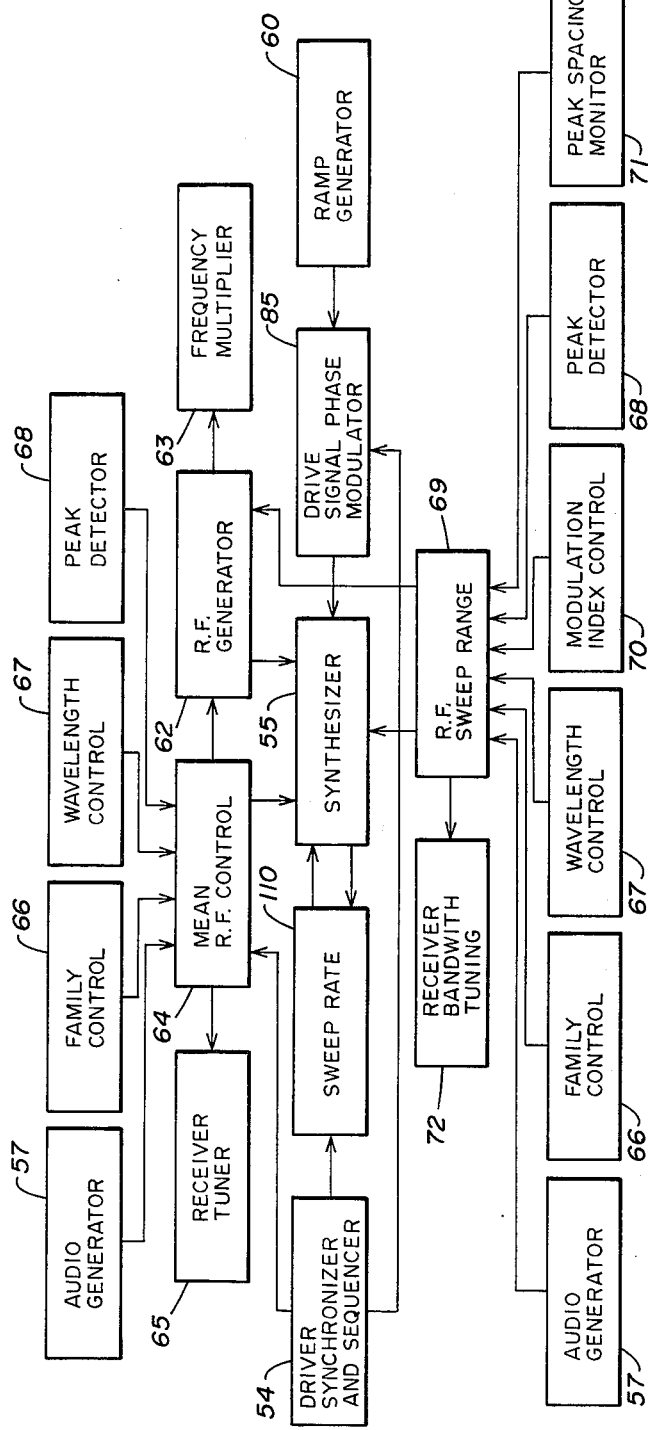
FIG. 9 is a block diagram of the acoustic generating and monitoring circuitry of the invention.

Referring now to FIG. 9, a plurality of radio frequency generators 62 produce signals on the order of 20–5000 KH$_z$ for pipes of less than 1 inch thickness. The frequency is controlled by the drive signal synthesizer 55 and the mean radio frequency control 64. The range of frequency modulation of the RF generator 62 is regulated by an RF sweep range control 69. The rate over which the RF frequency is swept is further controlled by a sweep rate controller 110. A phase modulator 85 is included for modulating the RF signal. A plurality of frequency multipliers 63 are used to generate signals for comparison with the received signals. For example a frequency doubler is required in one of the embodiments of the invention since the frequency of vibration of the pipe wall 1 is twice the frequency of the signal impressed on the coil 32 of the driver 12. Each of the receivers 37 is connected to a receiver tuner 65 which is responsive to the frequency of the driver signal and to other parameter of the pig operation. A controller 66 selects banded vibrations belonging to a predetermined family for consideration by the flaw analyzing circuitry according to the mode of operation or according to the conditions actually found or suspected in the test object. A controller 67 selects banded vibrations whose wavelengths fall within a certain predetermined range for consideration by the flaw analyzing circuitry according to the mode of operation or according to the conditions found or suspected in the object.

A peak detector 68 is used to monitor the maximum received amplitude. An index controller 70 continually monitors the modulation index of the signal being constructed in the sythesizer 55. A peak spacing monitor 71 measures, in frequency, the average peak spacing of the amplitude maxima in the received signal. A bandwidth control 72 regulates the audio bandwidth of the receivers.

As is shown in the block diagram of FIG. 10, a signal generator 73 is used to produce an azimuthal signal which detects the local vertical as well as the azimuth of the pig relative to any longitudinal feature of the pipe, such as a longitudinal seam to insure the drivers and receivers are positioned away from any possible interfering feature of the pipe wall. A steering signal generator 74 produces an output to the steering control motor which rotates the pig away from any orientation in which the drivers 12 or receivers 37 would fall along any interfering feature, for example, a longitudinal seam of the pipe. The speed of the pig as it travels along the pipe is monitored by a pig speedometer 75 the output of which is connected to a receiver synchronizer 76 to determine the appropriate time to turn on receivers in order to investigate a feature of the vibrational pattern at a given coordinate along the longitudinal axis of the pipe. The output of the pig speedometer 75 is also connected to a receiver frequency monitor 77 in order to compensate for any doppler shift in the signal due to the motion of the driver or the receiver which may vary from one point in the pipe to another.

A location signal generator 78 is used to produce an indication to locate the pig with respect to the starting or ending point of its journey through the pipe. The signal produced by the generator 78 is one which is capable of transmission through the pipe or the medium carried by the pipe or one which is detectable above ground at the location where the pig is situated.

A spacing detector 79 monitors the distance between the associated driver and the pipe wall. This may be a microswitch device which simply registers that the driver is no further from the wall than the certain prescribed distance. Each driver is only monitored when that driver is in active condition as determined by the sequencer and synchronizer circuit 54. The spacing detector 79 is located on the driver support 17 and changes its condition as the spacing exceeds a prescribed distance. The output of the detector 79 is connected to a driver wall spacing controller 80 which determines whether the associated driver is to be in an active position, that is presented to the pipe wall, or whether the driver is to be in a retracted position to avoid damage by an obstruction in the pipe wall. When an obstruction detector 81 notes the presence of an obstruction requiring the retraction of one or more of the drivers or receivers in operation at that moment, it produces a signal which is routed through a signal dropout indicator and is placed in a permanent storage 87 which notes the pig position and conditions at the time data taking was interrupted. The controller 80 also generates a change of mode command which alters the choice of drivers or receivers to avoid for a limited time the use of the drivers or receivers which may have been damaged by the obstruction. The storage 87 permanently records each significant event occurring during the logging operation; for example, the position and duration of signal dropouts caused by an obstruction; the position and type of mode changes; and the position and duration of the steering signals.

The receivers 37 are repositioned in response to an obstruction by a detector and controller 82 and 83, respectively. A gain controller 93 is responsive to the spacing of each receiver to control the gain of the a.m. detector circuitry within the pig. A master clock generator 84 is used for sequencing the operating of the equipment and as a data reference.

Figure 11:
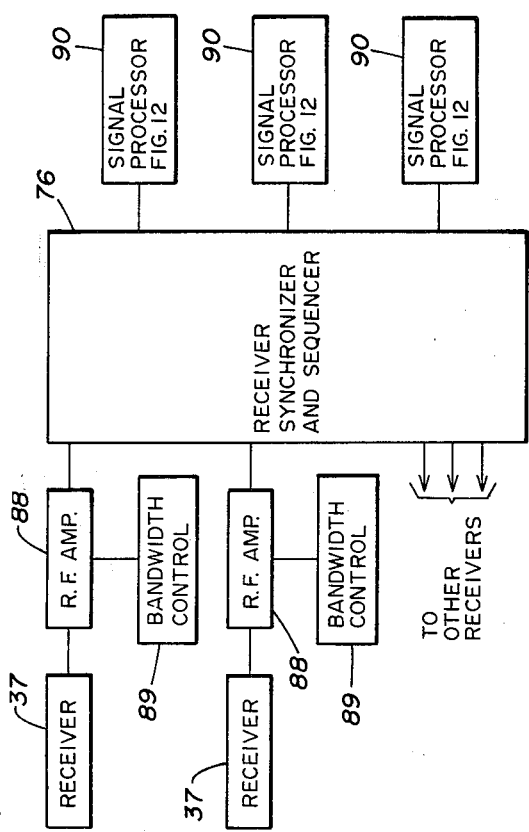
FIG. 11 is a block diagram of the monitoring and signal processing circuitry of the invention.

Referring now to FIG. 11, each of the receivers 37 is connected to a tuned radio frequency amplifier 88, through the receiver synchronizer and sequencer 76 and to individual signal processors 90. A constant gain bandwidth controller 89 is connected to each of the RF amplifiers 88.

Figure 12:
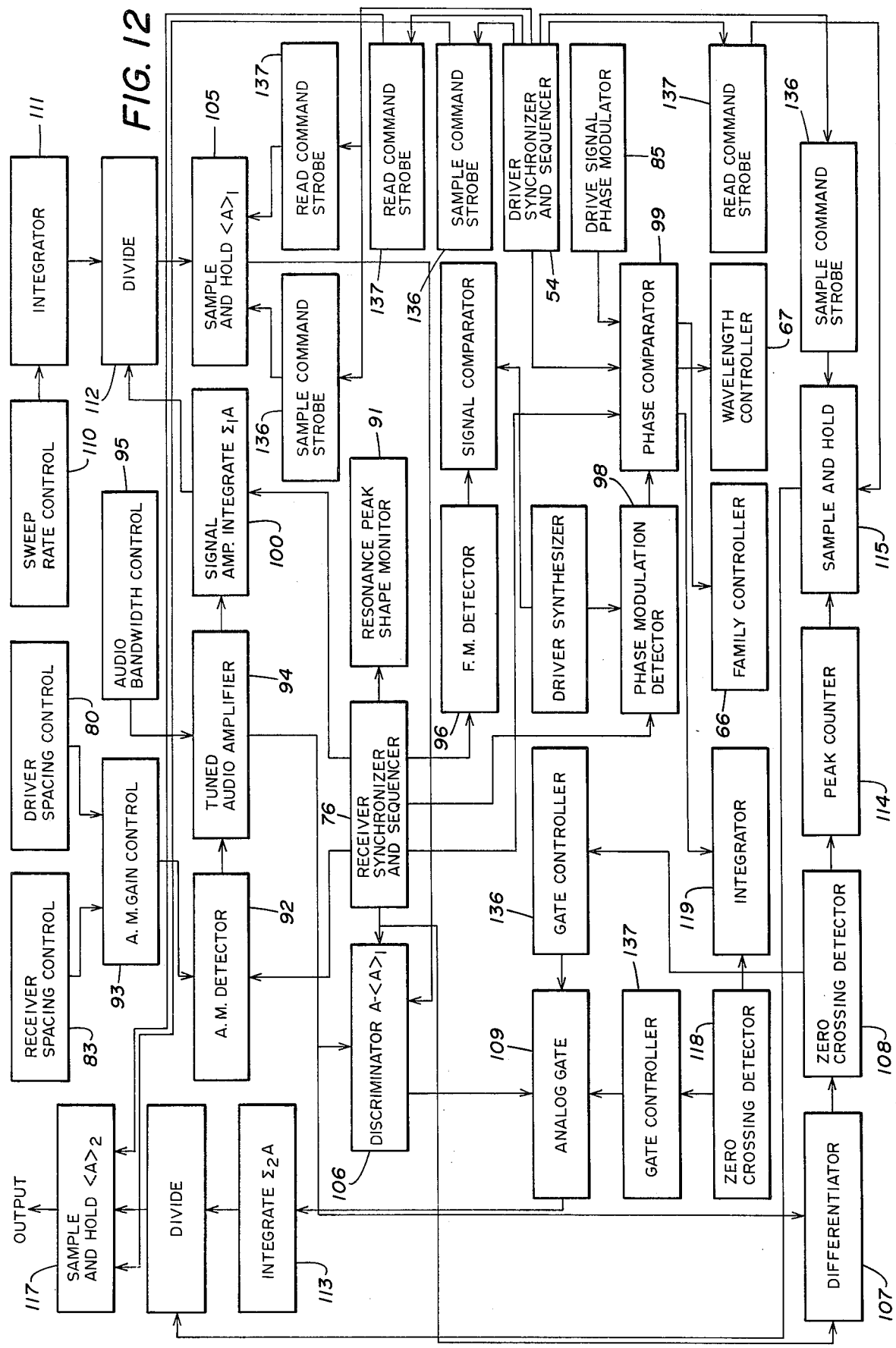
FIG. 12 is a block diagram of the monitored signal processing circuitry of the invention.

As is further shown in FIG. 12, in each of the processors 90 the amplified receiver signal is filtered and analyzed for amplitude, frequency and phase modulation. The receiver synchronizer and sequencer 76 is connected to a resonance peak shape monitor 91 and to an amplitude modulation detector 92 comprising an input diode and an RC filter (not shown). The time constant of the filter is selected to be long compared to the period of the radio frequency signal but short compared to the sweep rate signal. The sweep rate therefore is constrained to be many times less than the radio frequency. An a.m. gain controller 93, which is connected to the receiver spacing monitor 82 and spacing control 83 regulates the gain of the amplitude modulation detector 92 in accordance with spacing variations. The output signal from the a.m. detector 92 is fed to an amplifier 94. The amplifier is connected to a bandwidth controller 95 which regulates the audio bandwidth of the tuned audio amplifier 94 to accommodate signals up to a few times the sweep rate frequency. An integrator 100 performs a time integral of the amplitude modulation of the received signal. The output of the integrator 100 provides a reference signal against which the received signal amplitude variations can be compared. A sweep rate controller 110 is used in conjunction with an integrator 111 whose output is proportional to the integral of the frequency sweep rate control. This enables the measurement of the total sweep frequency interval along with the length of time for one sweep for normalization of the integrated amplitude to produce an average amplitude, $<a>_1$. An algebraic divider 112 produces an output which is proportional to the quotient of the two input signals. A sample-hold-read circuit 105 provides temporary analog storage with nondestructive readout of the averaged amplitude signals.

The output receiver signals are also connected through the receiver synchronizer and sequencer 76 to a frequency modulation detector 96 which detects any frequency modulation of the return signal by comparing the signal to the instantaneous doubled frequency of the driving RF from the drive signal synthesizer 55. The output of the f.m. detector 96 is fed to a signal comparator 97 for comparison to modulated signals from other receivers.

The output receiver signals from the receiver synchronizer and sequencer 76 are additionally fed to a phase modulation detector 98 which determines deviation between the return signal phase and the output of the frequency doubler in the driver synthesizer 55. A phase comparator 99 processes several received signals by comparison of these signals with each other and with the reference phase from the driver synchronizer and sequencer circuit 54 and the drive signal phase modulator 85. The phase comparator 99 is also coupled to the family controller 66, the wave length controller 67 and a peak detector 68.

The signal processor 90 of FIG. 12 also includes an amplitude discriminator 106, the discrimination level of which is determined by the output of the amplitude signal integrator 100 and the algebraic divider 112 through the sample-hold-read circuit 105. The discriminator 106 is also under control of the receiver synchronizer 76. The output of the discriminator 106 is either (1) proportional to that part of the incoming signal which is greater than the average signal or (2) zero when the received signal is below the average. The output of the phase modulation detector 98 is integrated at 119 and passed through a zero crossing detector 118 which actuates a gate controller 137 to operate an analog gate 109. The zero crossing detector 118 senses the condition of 90° phase shift between the received signal and the reference signal which has a variable phase shift relative to the doubled drive signal output from the driver synthesizer 55. The integrator 119 also acts as a low-pass filter. A differentiator 107 produces the derivative of the amplitude of the received signal while a zero crossing detector 108 produces a signal whenever the derivative of the amplitude is zero. The zero crossing detector 108 triggers a gate controller 136 to actuate the analog gate 109. The output of the analog gate 109 is coupled to an integrator 113 which processes the signal amplitude after discrimination and after all signals not due to peaks in the amplitude are removed by the analog gate 109. The output of the gate 109 is zero unless the amplitude is a local maximum as determined by the derivative being zero and unless the phase of the received signal satisfies certain criteria. A peak counter 114 stores a signal proportional to the number of peaks passed by the discriminator 106 and the analog gate 109 and the signal is stored in an analog sample-hold-read circuit 115. The integrated output from 113 is passed through an algebraic divider 116 whose output is proportional to the discriminated amplitude per peak, i.e., the ratio of peak amplitude less the average signal amplitude to the number of peaks with amplitude greater than the average. The output of the divider 116 is connected to a sample-hold-read circuit 117 which stores the value of corrected amplitude per peak.

Figure 13:
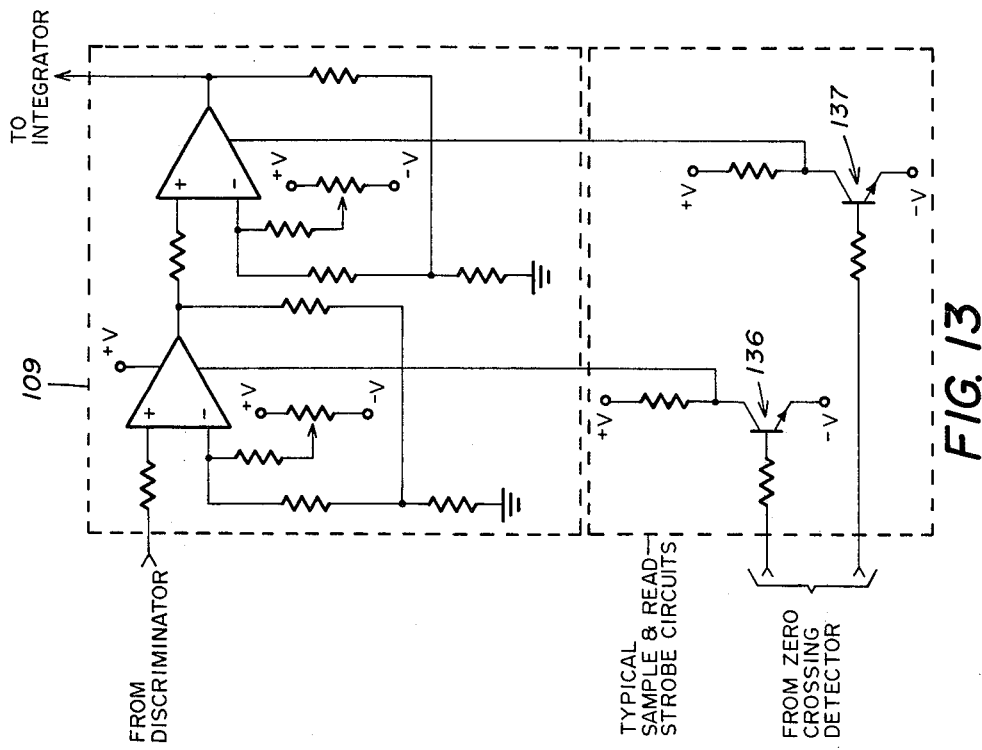
FIG. 13 is a schematic diagram of an analog AND gate as used in FIG. 12.
Figure 14:
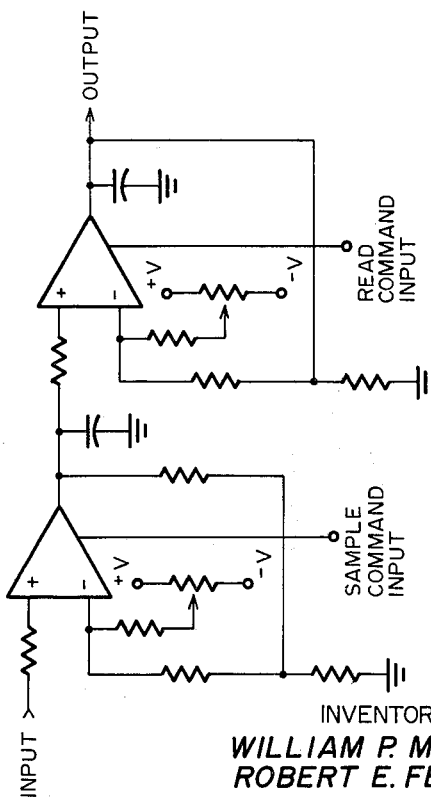
FIG. 14 is a schematic diagram of a sample-hold-read circuit as used in FIG. 12.

FIG. 13 is a schematic diagram of an analog AND gate such as the gate 109 of FIG. 12. The gain of the amplifiers included in the gate is controlled by input through gate controllers 136 and 137. The output of the analog gate 109 is zero unless there is an input of the correct sign and magnitude. FIG. 14 is a schematic diagram of a sample-hold-read circuit such as components 105, 115 and 117 of FIG. 12.

Figure 15:
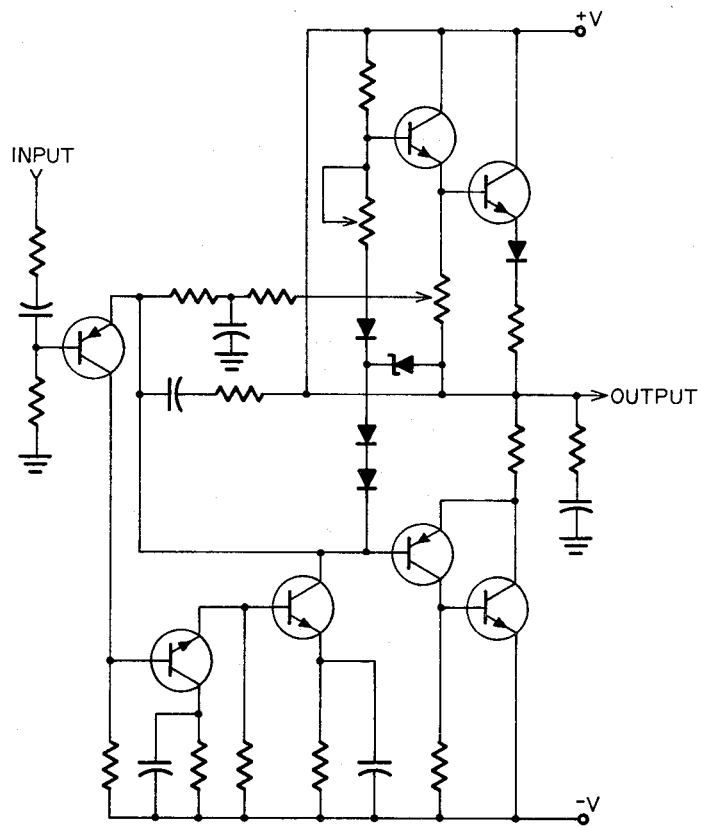
FIG. 15 is a schematic diagram of a power amplifier as used in FIG. 7.

FIG. 15 is a schematic diagram of a power amplifier, such as amplifier 53 (FIG. 7), which is used to energize the coil 32 of the driver 12 through the impedence matching circuit 52. For excitation of an 8 inch steel pipe a frequency on the order of 200 KH$_z$ and a circulating current of approximately 40 amps into the six-turn coil 32 has proven satisfactory.

Figure 16:
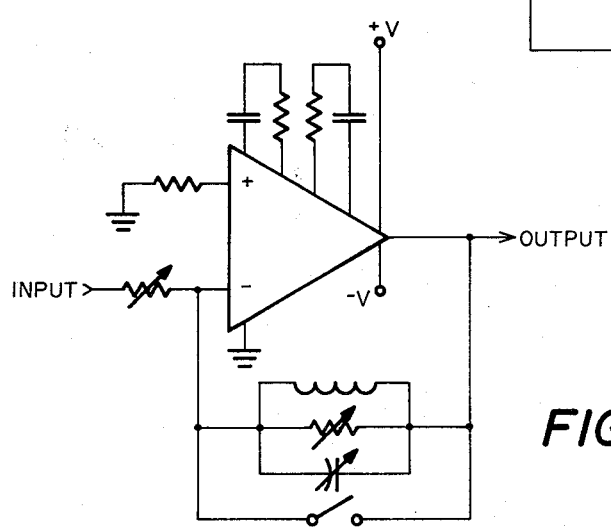
FIG. 16 is a schematic diagram of a variable tuning receiver and RF amplifier as used in FIG. 11.

FIG. 16 is a schematic diagram of a typical variable tuning receiver, such as the RF amplifier 88 of FIG. 11. The amplifier features variable gain, bandwidth and tuning and a switch 239 which is used to decrease the gain to zero for any receivers which are not being used at any particular time. A capacitor 218 is varied in conjunction with the frequency control of the radio frequency generator so that the receiver is always tuned to approximately the frequency of mechanical motion being excited or some harmonic thereof. Some or all of the receivers may be tuned to frequencies not simply related to the exciting frequency, in which case the link between the capacitor 218 and the frequency control of the radio frequency generator is omitted.

Figure 17:
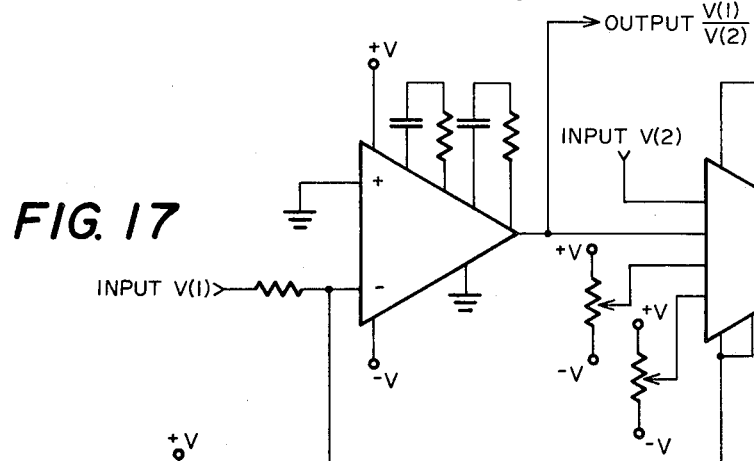
FIG. 17 is a schematic diagram of an algebraic divider as used in FIG. 12.

FIG. 17 is a schematic diagram of an algebraic divider, such as dividers 112 and 116 of FIG. 12, which is used to produce an output which is the quotient of the two input signals. The divider is used for computing normalized values of measured signals, such as in the weighted averaging process, and is built around a multiplier in the feedback loop of an operational amplifier.

Figure 18:
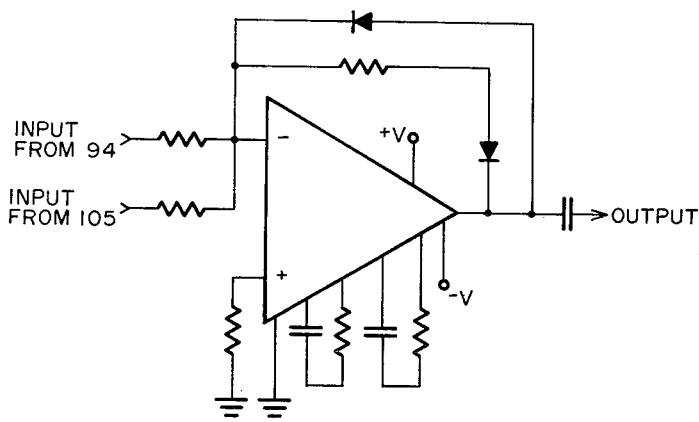
FIG. 18 is a schematic diagram of a single level discriminator as used in FIG. 12.
Figure 19:
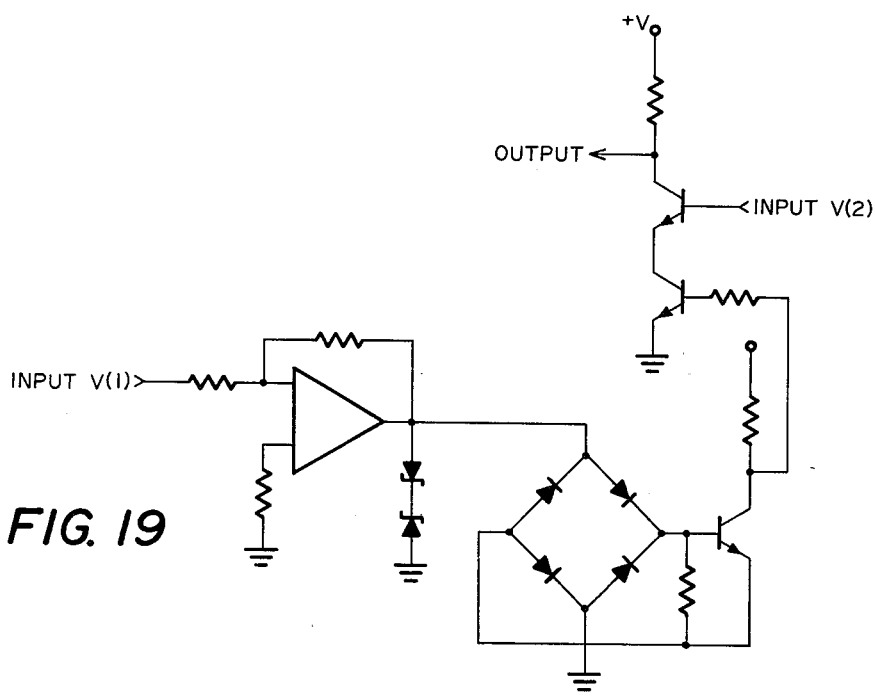
FIG. 19 is a schematic diagram of a zero crossing detector as used in FIG. 12.

A single level discriminator, such as unit 106 of FIG. 12, is illustrated in the circuit diagram of FIG. 18. FIG. 19 illustrates a zero crossing detector, such as detectors 108 and 118 of FIG. 12. Zero crossing detection is achieved by first amplifying the input signal sufficiently so that the diode bridge is conducting substantially all the time except when the input signal is in the immediate vicinity of zero. Conduction of the bridge keeps the output transistor in a conductive state so that output voltage is low. The voltage of the output transistor rises sharply in the vicinity of zero input to the circuit.

THEORY OF MECHANICAL TESTING WITH BANDED VIBRATIONS

Having described the general structure of the sonic pig used in testing mechanical objects with banded vibrations, the general principles and characteristics of banded vibrations will now be discussed. Banded vibrations lend themselves readily to the examination of objects such as relatively thin wall pipes for flaws and other structural defects. The test procedures which are employed in using banded vibrations possess the following characteristics:

1. Because the oscillating stress patterns of an object are examined by means of induced steady state vibrations within the object, it is possible to recover very large amounts of information concerning perturbations in the stress pattern due to flaws. The stress amplitudes are determined functions of the position of a transmitter-receiver pair located on the surfaces of the test object when the pair is operated so as to produce a banded vibration or banded vibration resonance.

2. The stress patterns due to banded vibrations are responsive in one way or another to the mechanical conditions which cause alterations in the induced stress patterns which mechanical conditions include:
 a. microscopic details of the structure of the material from which the object is made;
 b. microscopic or average details of the material comprising the test object; and
 c. the boundary conditions of the object including its shape, irregularity of boundaries, nature of the material and bonds at any interfaces 3. One of the important features of an induced banded vibration state is that the greatest stresses are present in a longitudinal segment of an object, such as a pipe, containing the region of excitation which segment is well localized longitudinally even in relatively long objects. This property results in a high degree of sensitivity to perturbations.

4. An important practical characteristic of banded vibrations is the ability to operate a test in a cursive manner along the length of relatively elongated objects. This property permits inspection of the behavior of banded vibrations when the points of excitation and observation are moving along the length of the object.

One of the features of banded vibration which is of extreme importance in testing is that the technique may be used at mechanical frequencies that are easily coupled into and out of a structure by electromagnetic non-contacting devices.

In testing with banded vibrations there are three classes of parameters involved. The first is that of independent variables which are controllable experimental parameters including the following:
 a. the exciting frequency which is coupled into the object;
 b. the frequency multiplying factor between the exciting frequency and the mechanical frequency of the object;
 c. the driver position, both longitudinal and azimuthal;
 d. the receiver position, both longitudinal and azimuthal;
 e. the relative receiver-driver position, both longitudinal and azimuthal;
 f. the position of the driver-receiver combination relative to any flaw, both longitudinal and azimuthal;
 g. the driver signal modulation, either amplitude, frequency and/or phase;
 h. various filterings of the received signal;
 i. the dominant polarization of the excited wave; and
 j. the penetration of the wave into the bulk of the object.

The second type of quantity which is important in employing banded vibrations to test mechanical objects is that of dependent variables which comprise measurable values or functional relationships between different independent variables and which include the following:
 a. the received signal amplitude;
 b. the received signal phase;
 c. the received signal modulation of frequency, amplitude and/or phase;
 d. the received signal spatial dependence; and
 e. the received signal relationship to the direction of vibrational particle motion within the body of the object under test.

The third class of parameters which are employed in the analysis of an object through banded vibrations is that of derived parameters which are ultimately the prime source of information concerning the test object. From analysis and comparison of dependent variables for various choices of the independent variables, the following measurements related to the object, such as a pipe, may be derived:
 1. the pipe thickness;
 2. the pipe diameter;
 3. the elastic constants of the material comprising the pipe;
 4. the presence of joints or seams;
 5. the interaction of the pipe with its environment or surrounding material;
 6. any external or internal agent, such as fluid pressure, producing patterns of stress in the material comprising the pipe; and
 7. deviations of any of these parameters.

Figure 20:
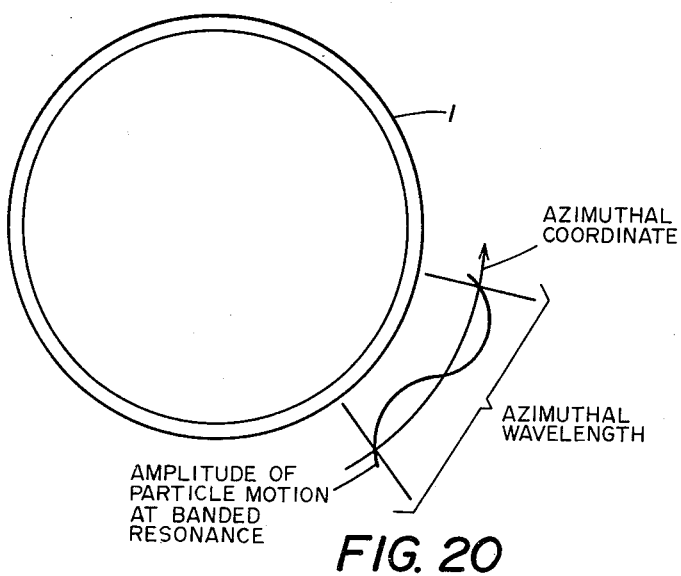
FIG. 20 is an illustration of the wave pattern of banded vibrations in a pipe.

Other derived parameters related to the banded vibrational waves may be measured. In a non-dispersive unbounded medium, the quantities used to describe waves are frequency, wavelength, phase, wave shape, amplitude and polarization. In such a medium, frequency, wavelength and phase are related to one another through the phase velocity in the medium and are further related to the coordinates of the points of excitation and observation. The banded vibrations involved in the present invention are of the class of states of vibration commonly known as driven resonances wherein all of the exciting waves, waves reflected from boundaries, and/or waves following re-entrant paths in the object have such a phase relationship that the majority of them produce constructive effects at many points in the object. This constructive interference effect produces a substantially stationary pattern of vibration fixed in relation to the boundaries of the object and/or the point of excitation. As shown in FIG. 20, the amplitude of particle motion within a pipe wall subjected to banded vibration is generally a standing wave pattern as a function of azimuth. A point of maximum amplitude is at the driver location and the nodes are stationary in the azimuthal direction.

Figure 20A:
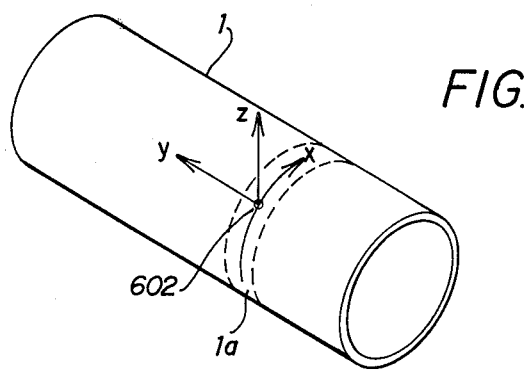
FIG. 20A is a pictorial view of a section of a pipe for banded vibration evaluation.
Figure 20B:
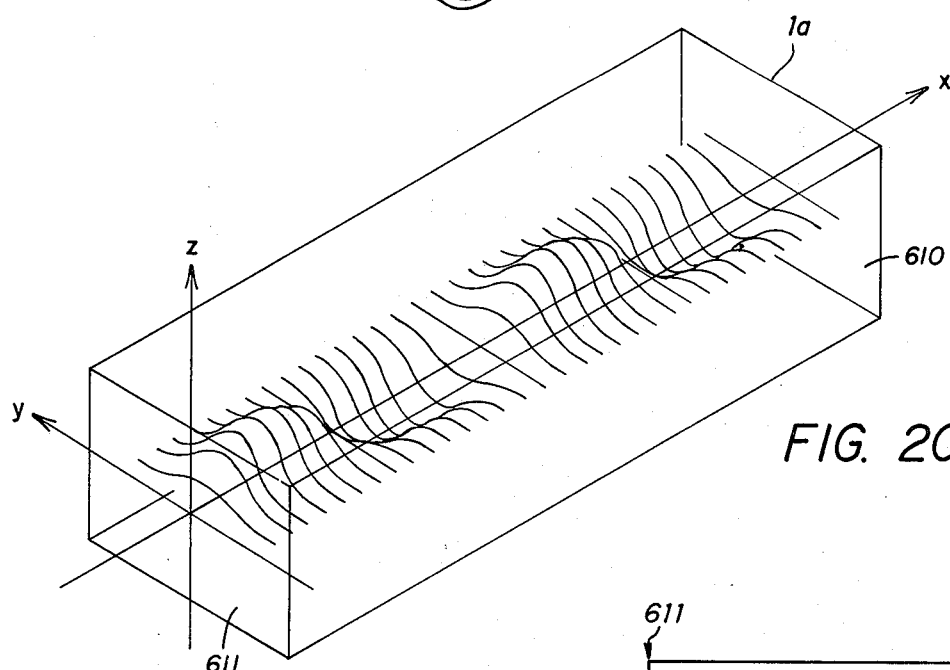
FIG. 20B is a pictorial view of a section of the pipe of FIG. 20A extended to show a banded vibration wave configuration.
Figure 20C:
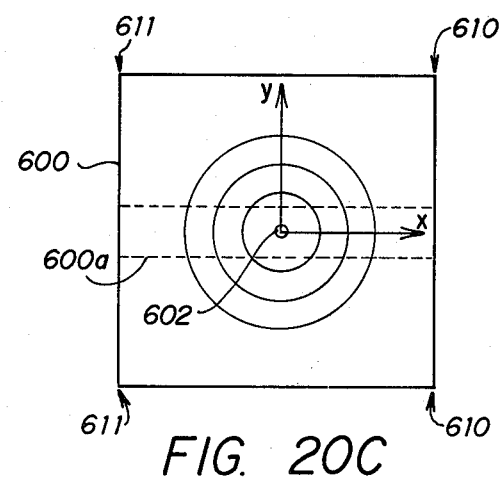
FIG. 20C is a plan view of a flat plate object to be evaluated by banded vibrations and illustrating the wavefront propagation.

An essential ingredient in the production of banded vibration for object testing is a sound conducting body or surface containing a set of ray paths which close on themselves either due to the connectedness of the body as shown by the pipe 1 of FIG. 20A or due to reflection from surfaces from a bounded object such as the plate 600 of FIG. 20C. Adjacent to the energy paths which close on themselves are many paths which remain in the neighborhood of closed paths for many traversals of the body or surface. Examples of such objects with closed paths and nearly closed paths are right circular cylinders (hollow or solid) and sheets with edges which are more or less regular and parallel over a distance equal to a wavelength of an exciting frequency.

Another prerequisite for the production of banded vibration is an excitation zone or zones 602 where stresses act on the body and in which intentional mode conversion (to be explained) takes place. In bodies having energy paths closed on themselves without reflection, the waves propagate without mode conversion until re-entering the excitation zone. For bodies (such as 600) and surfaces wherein a closed path depends on reflection or refraction, mode conversion occurs at the reflecting/refracting surfaces as well as in the excitation zone.

Figure 20D:
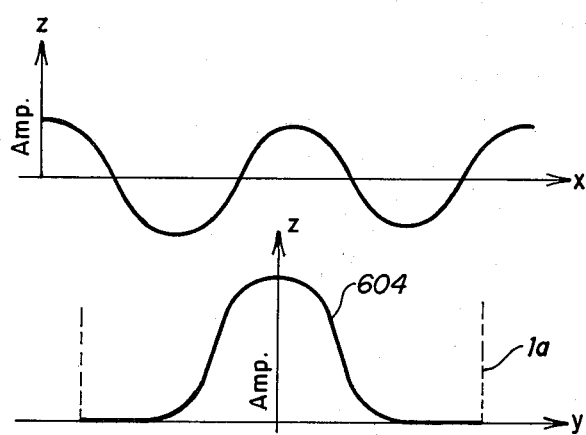
FIG. 20D are waveforms of the banded vibration along the X-axis direction and along the Y-axis direction.

Banded vibration is the localization property of a resultant composite wave pattern in a body with a re-entrant wave path passing through the excitation zone or zones. The composite wave amplitude is greatest in the vicinity of the re-entrant path and strongly diminished at points away from the path along the y-axis (curve 604, FIG. 20D) due to mode conversion losses and path dependent phase differences. Localization of the amplitude of the resultant wave along the y-axis, as shown in FIG. 20D, is controllable by the size and placement of the drivers 12 of FIG. 2. This is much different from standard methods for beam formation in wave patterns that rely on the size and phasing of the excitation regions to produce interference patterns whose amplitude strongly peaks in one or more directions. The novelty of the banded vibration pattern is partly that a band much narrower (compared to the wavelength) can be produced by very compact zones of excitation. The ability to produce a narrow banded region (band 1a and band 600a) of large amplitude vibration results from the use of the re-entrant path to provide some mode conversion loss on each revolution of the off axis wave about the pipe 1 or reflection/refraction in the object 600.

Referring to FIGS. 20A-20D, a band of vibration is produced in the region 1a and 600a through the interaction of return waves traveling in the x-axis direction (re-entrant path) with the stress distribution in the drive zone. A wave propagated in the x-axis direction by exciting a driver 12 at the surface of the pipe 1 or object 600 satisfies a set of boundary conditions at any point in its propagation. The boundary condition satisfied by the wave at each point is determined from the stress distribution, external or internal acting on the material. Thus in the simplest case of a free pipe with no stress distribution other than that due to the driver, the wave propagates according to the stress-free boundary condition. The wave inside the drive zone is different from the wave in the other regions because the driver represents a change in the boundary condition.

The process of mode conversion commonly occurs when acoustic waves are reflected (mixing of longitudinal and transverse waves), refracted (transmission across an interface), or scattered (encountering in inhomogeneity in the bulk or surface properties of the material). Any mathematical description of mode conversion is usually limited to very simple cases of plane boundary reflection and refraction. The mode conversion process is significant in the successful generation of a band of vibrations in the x-axis direction within the band 1a or 600a.

If a wave within the band 1a or 600a returns to the driver zone 602 such that the displacement it produces within the material of the pipe 1 or object 600 is in phase with the drive forces generated by the driver 12, then the energy flow from the driver to the pipe or object is a maximum. In this condition after many revolutions of the wave, the wave amplitude along the axis reaches an equilibrium value. This equilibrium is between the energy put into the wave from the driver and that lost to mode conversion. If the displacements of the arriving wave in the drive zone are out of phase with the stresses caused by the driver then the equilibrium amplitude will be less than the in-phase on-axis wave since the mode conversion slightly dominates the energy input. It is important to note that the wave amplitude in a banded vibration is the result of an equilibrium between energy addition and energy loss. The banded vibration process is operative even when the wave returning to the drive zone is not exactly in phase with the drive stresses. As long as the phase of the returned wave is within 90° of the phase of the drive stresses, the flow of energy is from the driver to the object. Off-axis waves return with a greater phase difference than the on-axis and therefore receive even less energy from the driver on each pass. Thus, the equilibrium amplitude on-axis is greater than that off-axis even if the phase of the returning wave is not exactly equal to the phase of the driver.

Consider specifically FIG. 20C, a propagating wave once set in motion by energizing a driver 12 moves with very little loss through the material. Attenuation due to actual losses by conversion to heat (frictional type) is very small in steels for frequencies in the range of 1 MHz or less. The driver emits waves from every point at the surface interface which travel outward in approximate cylindrical patterns decaying exponentially with radial distance from the drive zone. If FIG. 20C is taken as a rolled out section of a cylinder such as cylinder 1 then the edge 610 is really the same as the edge 611. Thus on a cylinder a wave leaving FIG. 20C at edge 610 re-enters the diagram at edge 611. These cylindrical "ripples" pass through one another on successive revolutions around the pipe 1, or reflections from the edge of the plate 600, and after a sufficient time for many revolutions of the wave around the pipe or reflections from the plate surface, the vibration pattern is a complex superposition of the patterns produced by each elemental driver point and by each successive reappearance of the waves as they circulate and overlap. Since the successive waves pass through the drive zone over a portion of a wave front, this part of the wave undergoes mode conversion as described above at each successive pass. With an out-of-phase displacement of such wave fronts as they pass through the drive zone, attenuation of the energy results. All these complex wave overlaps create a banded vibration due to the process of mode conversion acting on a wave in the re-entrant path to the drive zone. Waves traveling at an angle to the x-axis direction receive considerable attenuation at each passage through the drive zone. The end result of this is that for directions away from the x-axis direction, the composite wave undergoing mode conversion and reaching a receiver 37 (see FIG. 2) is much weaker than the axial wave which reaches an equilibrium amplitude.

As previously mentioned, a wave traveling directly in the x-axis direction receives only a minimum loss from mode conversion due to an in-phase relationship between the excitation wave and receives maximum gain as compared with an off-axis traveling wave. To accomplish this, the frequency of the driver is varied to control the phase of arrival of the re-entrant wave at the driver zone on successive passes. In general, for an arbitrary wavelength, the phase of the x-axis wave will be slightly different at every drive zone as the pig moves through the pipe 1. Some would experience more mode conversion attenuation than others and also experience greater or less gain or loss to the external drive circuit. The banded character of the vibration pattern will be apparent, however, even without imposition of strong restrictions on the frequency or wavelengths of the exciting energy applied to the driver 12. Frequency resonance, as classically defined, is not a necessary condition for a banded vibration.

Another advantage of using banded vibrations to produce a resonance and then analyzing for data on the mechanical condition and perfection of the object is that the banded vibration amplitude distribution is predictable in a well defined region of the object. Referring to FIGS. 20B and 20D, which is the band 1a (it also represents the band 600a) expanded to present a linear x-axis direction, the wave is characterized by the absence of side lobes and endwise resonance enabling an operator to acoustically examine a circumferential section of the pipe 1 or crosswise section of the object 600 with minimum interference from waves penetrating long distances on either side of the zone of interest. Thus, the banded vibration explores that region of known size in a body on which the amplitude is large.

The required closed path in a body, or reflecting path such as in the object 600, is present when a sound wave as described by a ray normal to the wavefront can travel from a point of origin and return to pass through that point in a direction substantially parallel to its original direction. The required almost closed paths are present when rays leaving a point of origin at small angles to the closed path ray return to pass through or near the point of origin at angles which are still small. In the case of the flat plate, the wave return is brought about by one or more reflections from the plate edge. In the case of the pipe 1, the wave return is brought about by the use of re-entrant paths which are closed paths that bring the wave back to the point of origin without the necessity of reflection.

Although the process of producing a banded vibration does not depend critically on frequency as does the process of producing customary resonance, the resonance condition will add to the value of the banded vibration technique just as it adds to the value of many other devices utilizing wave phenomena. The frequency dependence of banded vibration production arises through the need to tailor the number, position and size of the drive zones so that strong mode conversion attenuation acts on the off axis rays. The relation of the frequency of banded vibration to the drive zone design is through the wavelength of the chosen mode.

The relationship between the paths closed on themselves and the driver zone is that the driver 12 is structured and oriented to send acoustic waves of the desired type at least along the closed path and many of the nearby almost closed paths. The driver dimension perpendicular to the x-axis direction must be sufficient to intercept rays in the off axis path to attenuate them by mode conversion. This driver dimension depends on the wavelengths of the emitted wave, the roundtrip distance of the closed and almost closed paths, and on the width of the band desired. The driver design governs the effectiveness of the mode conversion process. If the drive zone width is too small, many off axis waves propagate without intersecting and this results in strong side lobes. Also, for very large drive zone widths, it is conceivable that several bands would be excited.

In order to examine an entire object, a banded vibration is formed and then scanned over the object by moving the excitation zone perpendicular to the generated band. With reference to FIGS. 20A–20D, the band is generated in the x-axis direction and the zone of excitation is moved in the y-axis direction. This requires that the shape and dimension of the object are such that a re-entrant wave path exists for many points along the path of the exciter. Not every point along this path must have a re-entrant wave path since the banded vibration explores the object over a region comparable to the bandwidth. However, for a complete examination there must be enough points along the object that a band excited at one would overlap the band produced by moving the exciter to an adjacent point.

The smooth and controllable vibration profile of the banded vibration is particularly valuable in evaluating the characteristic of an object such as a pipe. The response to an inhomogeneity changes in a predictable manner as the band is moved along the object by moving the drive zones along the surface. The location of the inhomogeneity is easily coordinated with the location of the banded vibration. Since the banded vibration technique has control over the distribution of the amplitude of the wave along the x-axis direction and across the front of the wave in the y-axis direction. Combining this with waves of known depth along the z-axis distribution, such as Rayleigh and Lamb waves, gives complete three dimensional knowledge and control over the vibrational amplitude. Thus, the whole volume of an object can be explored by moving the band along the object. The knowledge of the y and z amplitude distributions enables the regions of the maximum sensitivity and minimum sensitivity to be identified.

When an object is near a resonant condition, the amplitude of vibration becomes a very sensitive function of the exciting frequency. For a case where the combined condition of boundaries and resonance are imposed, the relationship of the dependent variable, amplitude, to the independent variable, frequency, can be measured as an indication of the physical condition of a test object. Many other derived variables may be obtained relative to vibration wave parameters and used to determine the physical characteristics of the object under test.

FLAW TEST RESULTS AND DATA INTERPRETATION

The objects selected for examination with the sonic pig of the present invention are thin walled pipes which are either of the seamless or longitudinally welded variety. The values of the ratio radius/length vary from 3 to 48 and the values of the ratio thickness/radius varies from 1/20 to 1/12. Tests were conducted with the pipes both freely supported and strongly end-damped. The end-damped pipes had collars of dissipative material encircling the outer circumference of the pipe ends. In the present examples of testing for flaws, two types of permanent flaws were inflicted upon the pipes. These were:

1. Metal displacement flaws wherein a groove was cut completely around a pipe circumference with a wheeled pipe cutter so that both the width and depth of the groove were less than one-eighth of an inch.

2. Metal removal gouge flaws were generated, two of which were irregular ground gouges having a depth equal to half or less of the pipe wall thickness, a length of roughly 4 inches and a width of roughly one-half inch. The third metal removal flaw was made with the tip of ⅜ inch twist drill to a depth of roughly three-sixteenths inch. This particular flaw represents the removal of only slightly over 2 grams of iron from a short length of iron pipe having a mass of over 10,000 grams.

The placement of the experimental flaws on the pipes were chosen to be between one-half and three-fourths the length coordinates of the pipe in order to avoid any coordinates which might have a fundamental relationship to standing wave patterns of the free undriven pipe. The orientation of the gouge flaws was off-axis by 30°–45°, again to avoid any choice which might artificially enhance a response.

ENERGY SURPLUS AND DEFICIENCY RESPONSE

Figure 21:
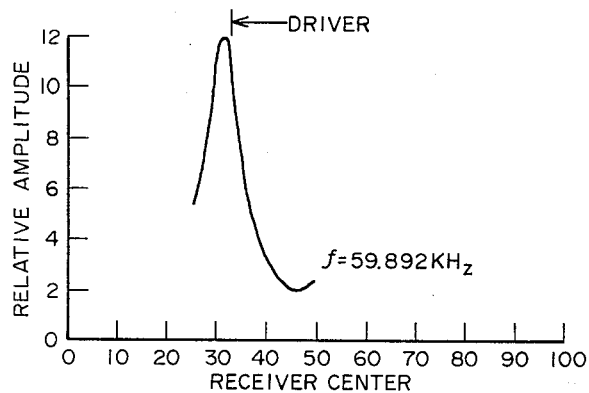
FIGS. 21–23 are graphs of amplitude versus receiver-driver separation for three different unflawed pipes illustrating bandedness of the vibrations induced therein by the system of the invention.
Figure 22:
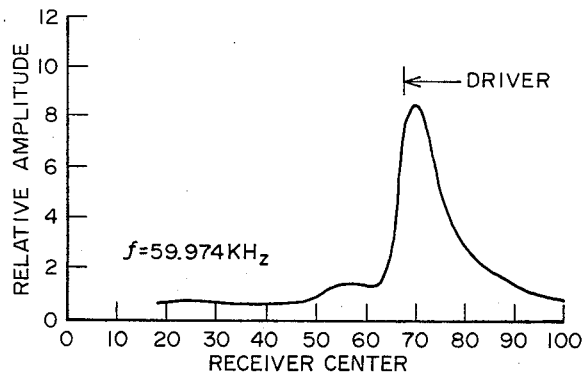
Figure 23:
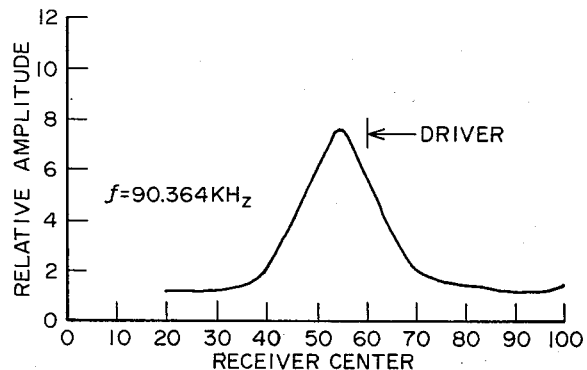
Figure 28:
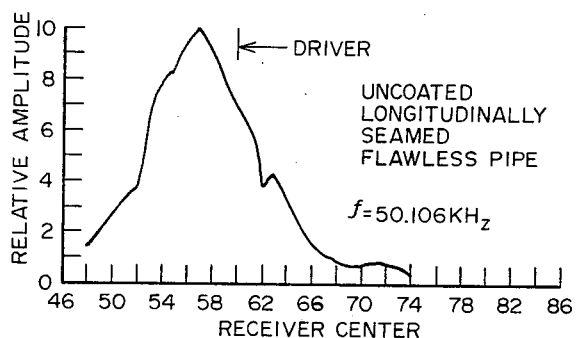
Figure 29:
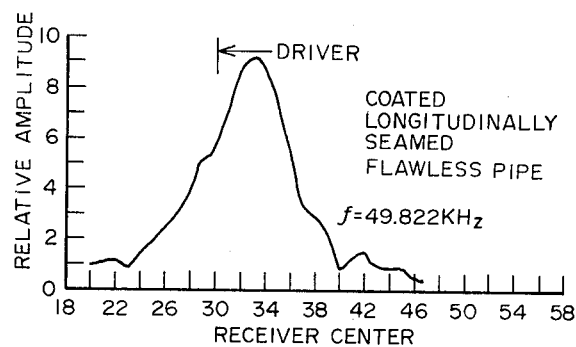
FIG. 29 is a graph of a different location on the same unflawed pipe as in FIG. 28 after coating the pipe with a doping compound.

The first type of exemplary test which was performed using the method of the present invention successfully showed the presence of all four of the flaws mentioned above. In this test, the independent variables were frequency and the driver-receiver-flaw relative coordinates. The dependent variable chosen was the received signal amplitude. The test was first run on unflawed pipe and then repeated on pipe having the intentional flaws described above to correlate the difference in response with the presence of flaws. During the tests, the individual independent variables were changed in the following order: First, the driver position was fixed and the driving frequency was fixed on a banded vibration characteristic of the driver position. The receiver was then moved longitudinally along a line substantially axial maintaining the greatest possible signal amplitude by changes in azimuth slightly less than one-quarter wavelength. This procedure successfully mapped distribution of vibration amplitude as a function of longitudinal coordinates relative to the driver. When a map was made on both sides of the driver position for a sufficient distance to delineate the region of bandedness, the driver was moved longitudinally and the process repeated. The results of the tests were that the amplitude of vibration when the driver was exciting one of the banded vibrations was a strongly decreasing function of the receiver-driver longitudinal separation. The resulting graphs, shown in FIGS. 21–23, of amplitude versus receiver-driver separation for three different unflawed pipes are bell-shaped curves having a maximum near the driver coordinate and a width at half-maximum on the order of 6–10 inches on 8 inch pipes at a frequency below 250 KH$_z$. The result was essentially the same for both seamless and longitudinally seamed pipe both coated and uncoated. FIG. 28 is a graph of the bell-shaped response of a longitudinally seamed uncoated pipe while the data shown in FIG. 29 is a different location on the same pipe after coating with a doping compound.

Figure 24:
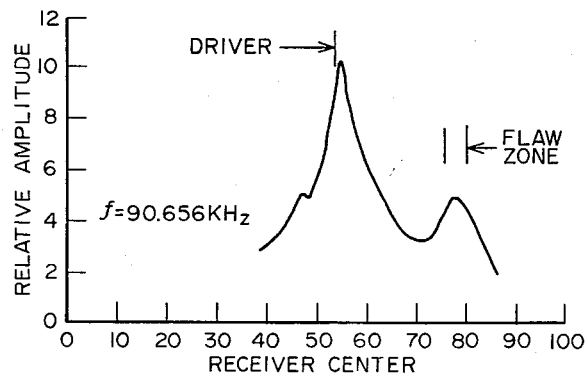
FIG. 24 is a graph of amplitude versus receiver-driver spacing for a pipe having a gouge flaw and subjected to banded vibrations.
Figure 25:
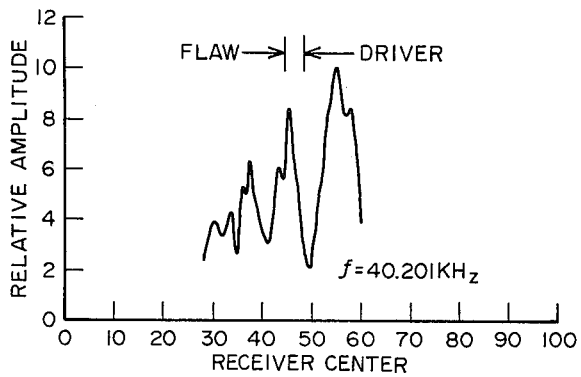
FIGS. 25 and 26 are graphs of amplitude versus receiver-driver spacing for a pipe having a ring-shaped metal displacement flaw and subjected to banded vibrations.
Figure 26:
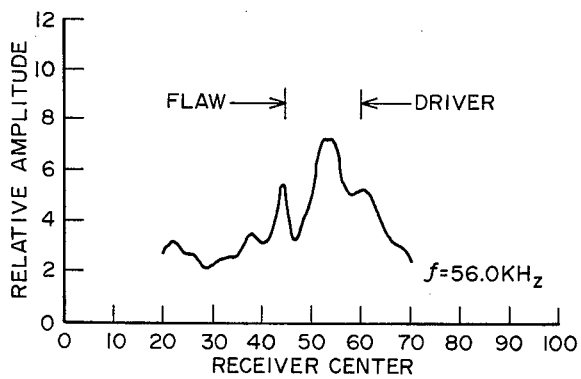
Figure 27:
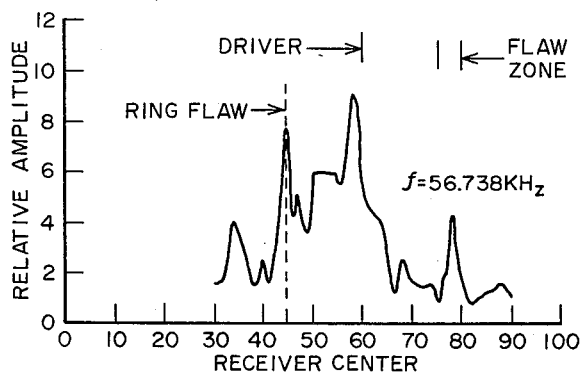
FIG. 27 is a graph of amplitude versus receiver-driver spacing for a pipe having both a gouge flaw and a ring-shaped metal displacement flaw and subjected to banded vibrations.
Figure 32:
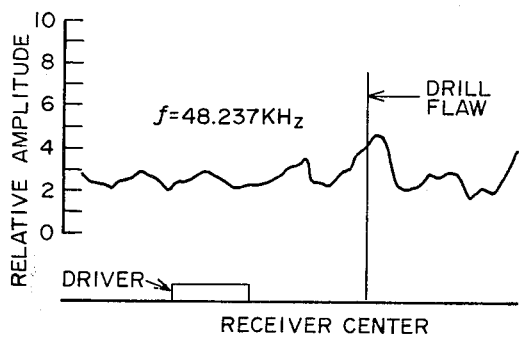
FIG. 32 is a graph of a resonance excited in a very short pipe having a length of about ten times the wavelength. The receiver was moved along a node of the vibration pattern and an amplitude increase is seen in the region of the small flaw.

An observation during this test was that for all four examples of intentional flaws inflicted on the pipe, the characteristic bell-shaped curve associated with the banded vibration in homogeneous pipe was disturbed by the presence of and accurately at the location of the flaws. This is the case both when the receiver follows an azimuth of substantially maximum amplitude, as shown in FIG. 27, and when it follows an azimuth of substantially minimum amplitude, as shown in FIG. 32. In each case the disturbance in the banded vibration pattern was in the form of a maximum in the bell-shaped curve centered at the longitudinal coordinate of the flaw and having a width comparable to that of the length of the flaw itself. For example, in FIG. 24 is shown a graph of the amplitude response to a gouge flaw, illustrating the second peak in the flaw zone. FIGS. 25 and 26 illustrate second peak responses to the ring-shaped metal displacement flaw for various driver positions and frequencies. FIG. 27 illustrates second peak responses to both a gouge flaw and the ring-shaped flaw for a single placement of the driver.

Figure 30:
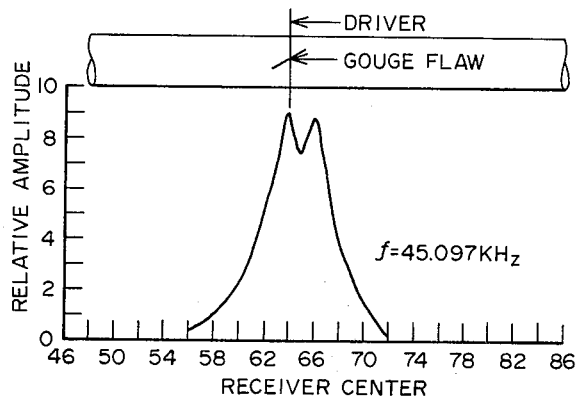
FIG. 30 is a graph of amplitude versus receiver-driver spacing for banded resonance which can be excited only in the immediate vicinity of the flaw.
Figure 31:
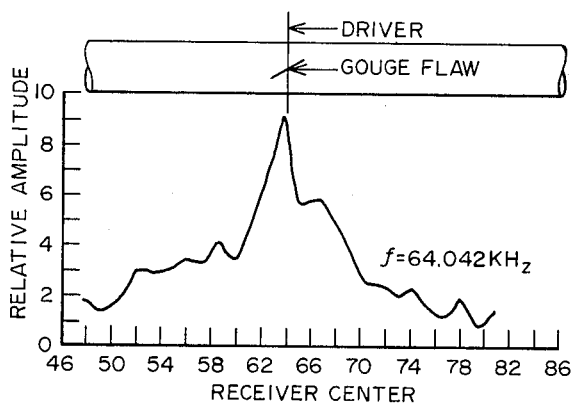
FIG. 31 is a graph of amplitude versus receiver-driver spacing for a banded resonance which can be excited either near the flaw or in unflawed pipe.
Figure 33:
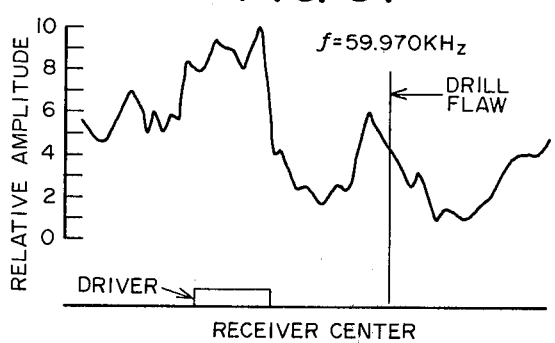
FIG. 33 is a graph of a resonance excited as in FIG. 32 except that the receiver was moved along the antinode of the vibration pattern.

The response was generally the same for the other gouge flaws, as illustrated in FIGS. 30 and 31, as well as the short pipe section with a drill flaw, curves for which are shown in FIGS. 32 and 33.

The twin peak effect was apparent at any relative driver-receiver-flaw azimuthal coordinates. That is, the disturbance of the banded vibration pattern caused by the flaw extended completely around the pipe in the azimuthal direction and was located in the segment defined by the length of the flaw in the longitudinal direction. This effect was observed for several different banded vibrations in the customary frequency range of 5–250 KH$_z$. It was also found that the wavelength associated with the vibration pattern may be either larger or smaller than the minimum dimension of the flaw being tested and still indicate the flaw with good sensitivity.

The flaw response in the amplitude responsive test, described above, was of particularly high quality. Even when a receiver broadly tuned in frequency to the frequency of the motion of the excited banded vibration was employed, there was a strong characteristic response at the position of the flaw. From this result, it can be deduced that the motion induced in the flawed segment by the distant driver contains at least one component having the same temporal frequency as that in the region adjacent to the driver. Further, the wavelength of vibration in the azimuthal direction is the same near the flaw as it is at the driver. Thus this flaw response can be characterized as the formation out of energy delivered longitudinally by the driver of a separate banded vibration at the same frequency and wavelength as the banded vibration near the driver. The spatial and temporal phases of the flaw-related band differ from the phases of the driver-related band and indicate that a receiver system having phase discrimination would also be flaw responsive without the need for amplitude measurements.

The presence of the flaw couples energy out of the banded vibration, which energy differs in azimuthal wavelength, and longitudinal wavelength from that associated with the driver. Thus, a receiver system made properly responsive would show that the banded vibration at the position of the flaw contains admixtures of other members of the family to which the driver-related banded vibration belongs as well as members of entirely different families of vibrations. A receiver system properly responsive to wavelengths completely distinct from those excited by the driver is flaw responsive. Difference in received frequency from driving frequency can also occur if the material is, naturally or by virtue of the flaw, non-linear in its response.

The flaw response using the techniques of the invention is of very high quality as compared to conventional flaw detection methods. For example, it was not unusual to find the ratio of the secondary maximum to the extrapolated received signal amplitudes, based on the extrapolation of the driver-related bell curve, to be on the order of five to 10 times. In the experimental tests described herein, the actual data gathering steps are not in the traditional order in which they would occur for a cursive pipe inspection system. However, by simply reordering the steps which correlate data points for common driver spacings, the equivalent of a cursive inspection may be obtained. The cursive inspection may consist of measurement of received signal amplitude correlated in time with the position of the moving driver-receiver equipment.

The present technique works well even for large receiver-driver spacings, for example, spacing on the order of four times the radius of the pipe being inspected have proven effective. This spacing increases the ratio of the flaw signal to the tail of the bell-shaped curve at the driver. Additionally, the spacing greatly aids in reducing the influence of any mechanical pipe feature which is on the side of the driver opposite the receiver in question as well as reduces the stray electromagnetic and acoustic coupling between the driver and receiver.

When the driver is in the immediate vicinity of the flaw zone, that is, when the bell-shaped amplitude curve of the banded vibration overlaps the position of the flaw, there is no apparent increase in the banded vibration amplitude. It is to be noted, however, that in the tests employed, a receiver system of low selectivity was used.

The present technique is very sensitive to even gradual inhomogeneities in the mechanical condition of a pipe, as is demonstrated by a phenomena termed stair-step effect. The amplitude distribution in the vicinity of the driver's longitudinal coordinate, while exciting a banded vibration, may deviate considerably from a monotonic symmetric bell-shaped curve. In fact, the amplitude distribution may even be unsymmetrical, oscillatory, and displaced away from the driver longitudinal coordinate in sections of pipe which contain no visible alteration in condition. In tests that were run with several samples of pipe, changes in the character of a given banded vibration amplitude occurred at certain positions. These positions of anomalous behavior coincided with positions in which variations in the characteristic frequency of the banded vibration for a given azimuthal wavelength occur. The characteristic frequency has the feature that it is constant to a high degree on either side of one of these zones and changes abruptly in a span of less than a radius. The direction of change may be either that of increasing or decreasing frequency and in the samples of pipe having several stair-step zones, there was no apparent rule for predicting the relative sign of successive frequency steps. One explanation for this phenomena is that it is the longitudinal equivalent of frequency splitting which is the second type of flaw response to banded vibrations discussed below. It is also possible that these positions coincide with inhomogenieties caused by the fabrication process of the pipe.

FREQUENCY SPLITTING FLAW RESPONSE

In addition to the first test which involved observation of an additional amplitude peak in the banded vibration amplitude curve at fixed frequency in response to the presence of a flaw, a second series of tests was made involving the observation of frequency splitting in response to a flaw. In the vicinity of a flaw, the function representing vibration amplitude with respect to exciting frequency produces two or more frequency separated maxima where in an unflawed pipe only one maximum would occur. One of the characteristics of frequency splitting is that the split peak or twin peaks occur very close to the frequency of the original peak and the onset of splitting is gradual as the zone of the band approaches the flaw. Further, the most significant derived wave parameters for the two signal maxima are the same as each other and are the same as the single peak in unflawed pipe when a receiver system having low discrimination is employed. Higher discrimination on the receiver may enable the members of the split peak to be distinguished in a manner related to wave parameters and not simply by their relationship to the single peak. The members of the split peak correspond to distinct patterns of vibration on the pipe even though their basic wave-related parameters are the same. It was also observed that one member of the pair of peaks is more strongly associated with the position of the flaw than is the other, FIG. 30.

Frequency splitting is produced by a number of non-flaw related parameters which must be discriminated against during a test for defects. Some of the causes of close lying peaks in a data display are the influence of faraway regions in the pipes such as end effects (also termed fine structure), weld effects both longitudinal and circumferential, and interfering signals from crosstalk or modulation of the exciting system.

This stair-step effect mentioned above is an example of the influence of nearby regions of the pipe. This particular effect is best discriminated against by the receiver system itself. The multiple amplitude peaks due to influences of nearby sections of the pipe differ in their peak shape, their amplitude versus frequency relation, in their amplitude versus longitudinal receiver coordinates, and in their phase versus frequency relation, any of which may be used to discriminate against or identify the stair-step effect.

The discrimination against end effects and weld effects is more complex because of their similarity to the responses to a flaw. The presence of end effects and weld effects is not always apparent to the unaided observer in a data display of amplitude versus frequency sweep because of the particular pairing of the flaw associated resonant peaks.

In order to separate out end effects and weld effects from flaw effects characterized by frequency splitting, it is necessary to employ empirical and theoretical criteria.

It is necessary to separate out the end effects and weld effects from flaw effects in data consisting principally of the amplitude maxima of the received signal and the frequency of the signal as it passes through a maximum. Selected data points of amplitude and frequency at signal minimums were also recorded as a check on the level of radio interference and non-resonant background noise. The recording of positions of minima of amplitude also serve as estimates of the width and frequency of the peaks and permit allowance for the possibility that due to interference with the non-resonant background or with signals from nearby resonances, a peak could appear as an amplitude dip due to destructive interference.

The data consisted of sets of amplitude-frequency pairs for each longitudinal coordinate and were mathematically processed to identify certain types of amplitude-frequency patterns as being characteristic of sections of pipes containing flaws. The object of the analysis was to develop from the data gathered a set of numerical criteria which could be used to sort the amplitude peaks into classes corresponding to end effects, weld effects, and flaws. A rule was developed for assigning a value to each longitudinal position along the pipe or to successive sets of positions at which data was recorded. Successful analysis has enabled the elimination of system sensitivity to end effects and weld effects so that the unflawed portions of the pipe yield essentially a null value while the flawed portions produce a non-null value with quantitative significance in judging the severity of the flaw.

The observations of data from fine structure associated with end effects, as well as data associated with welds, demonstrated a pattern of very closely spaced resonances, on the order of 5–20 $H_z$, which decline rapidly in amplitude in such a way that the first peak in a group is normally the strongest while successive peaks are weaker by 50% or more. This large decrement ensures that in the majority of the cases there are few peaks, if any, with amplitudes equal to 50% of the main peak.

The first step in the analysis of the data obtained is to determine the average amplitude of all the peaks on the fine structure group to remove the effects of driver and receiver efficiency and receiver azimuth. In the sonic pig described above, the analysis is performed chiefly by the circuitry of FIG. 12 as was discussed at that point. Average fine structure information is also available from the measurements of the minima concerning the size of the non-resonant background and the electromagnetic interference. The information is used to calculate the signal above noise level and the average signal corrected for background interference.

The next step in analysis consists of a comparison of all peaks greater than the corrected average with the difference of the amplitude of the strongest peak and the corrected average. Each peak amplitude is reduced by the amount of the corrected average prior to comparison. This has the effect of enhancing the contrast so that percentage differences between peak heights is increased. All peaks which fall below the corrected average are removed from the sample and stored for later consideration. Because the number of peaks in a fine structure group is often very large, the data is modified by eliminating peaks less than 5% of the absolute maximum to prevent the inclusion of large numbers of very small peaks from drawing the average down.

The next step in the process is that of averaging a second time the values of peak amplitude less the first corrected average. The first averaging process primarily removes the many small peaks while the second averaging process of the set of data surviving the first selection establishes a better norm for amplitude comparison. Next, the unweighted average of the frequencies after the first selection is calculated, as well as the amplitude weighted average of these same frequencies.

Figure 34:
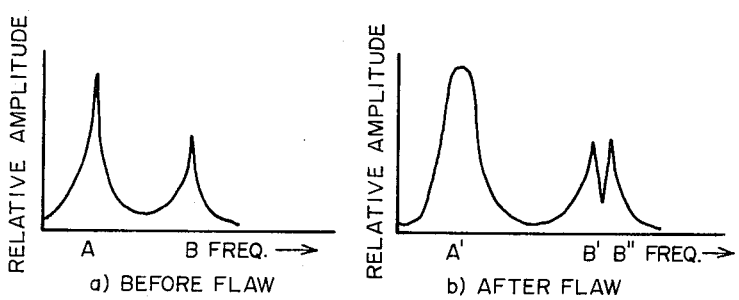
FIG. 34A is an illustrative graph showing a pair of amplitude resonances on unflawed pipe subjected to banded vibrations.
FIG. 34B is an illustrative graph of the same pipe as in FIG. 34A subjected to the same banded vibrations having a flaw and illustrating peak splitting and peak shift and peak distortion.

After the steps of averaging, sorting, and a second averaging, those peaks stronger than the second average amplitude are selected and an amplitude equal to peak amplitude minus the sum of the first and second averages was computed for each. At this point, there is a direct correlation between the pattern of the data and the presence of flaws. The set of peaks greater than the first and second averages generally contain only one member, i.e., a single peak, in unflawed piped. A characteristic of a flawed zone, however, is that the peak set contains at least two members, i.e., two peaks. Further, that two peaks have an amplitude generally within 25% of one another and the onset and decay of the split peak pattern occurs generally within 1 inch of the actual longitudinal flaw coordinates. The same pattern is observed at several different frequencies corresponding to the different azimuthal resonances. The illustrative graph of FIG. 34a shows resonance peaks A and B for unflawed pipe sections while FIG. 34b shows frequency splitting at peak B into a frequency separated pair B' and B''. The data processing steps determine the frequency spacing between peaks as the quantitative readout for a flaw position and severity.

Since for most positions on a pipe being inspected, only one peak remains after the selection process, places on the pipe which give a non-zero output signal are definitely flaw related. A characteristic of the twin peaks is that they are very well resolved in that a low amplitude separates the two amplitude maxima. The frequency difference between the two peaks is generally observed to be of the order of 50 $H_z$.

As in the first flaw finding mode, energy concentration near the flaw discussed above, the longitudinal separation of the driver-receiver is also significant in the use of the frequency pairing mode. Such driver-receiver separation is valuable in reducing electromagnetic interaction between the driver and receiver. The frequency splitting mode works well with longitudinal separation of the driver and receiver. The primary effect of the driver-receiver longitudinal spacing is to yield a received signal characteristic of that longitudinal zone of pipe between the driver and receiver locations. One of the fundamental characteristics of the azimuthal resonances comprising banded vibrations in combination with a driver-receiver offset is that of decreasing the region of pipe materials to which the received signal is responsive.

Figure 35A:
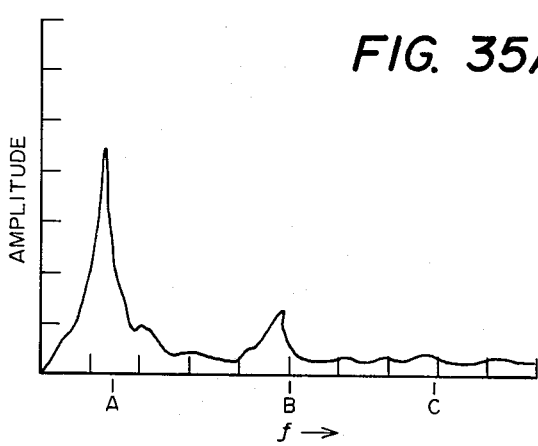
Figure 36A:
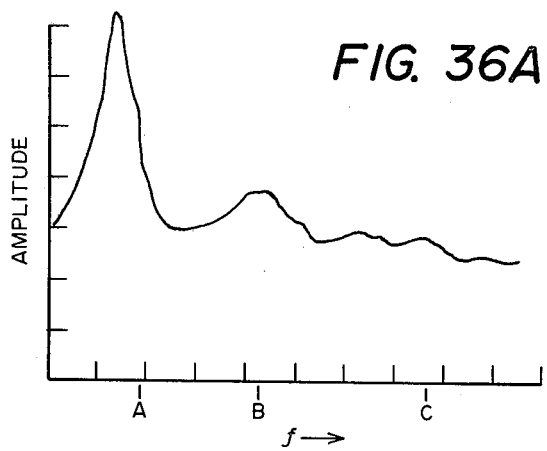
Figure 35B:
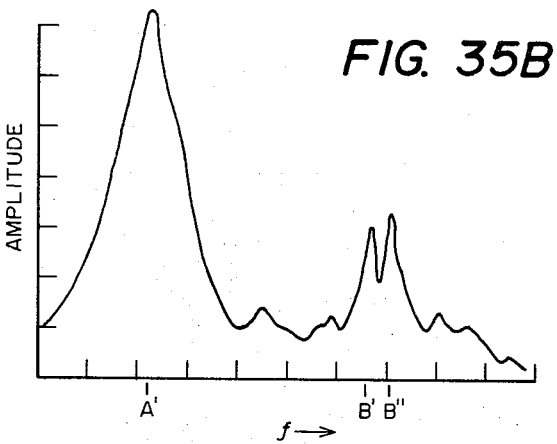
FIGS. 35B and 36B represent the same pipes having flaws and illustrating frequency splitting in response thereto.
Figure 36B:
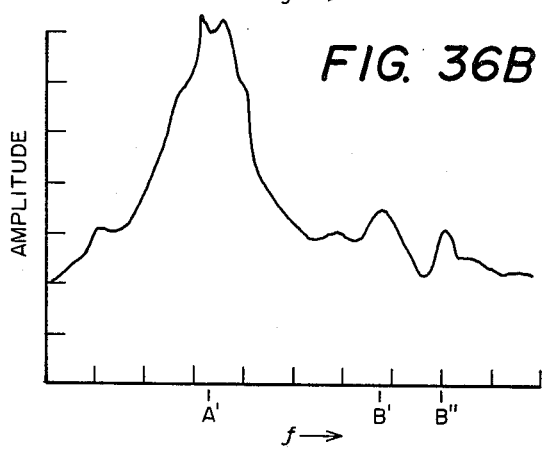

The graphs shown in FIGS. 35a and 35b and 36a and 36b show the effect of frequency splitting due to the presence of a flaw. FIG. 35a shows data obtained from excitation before flawing. FIG. 35b shows the same peaks after flawing with the indication of the effect on peak B in the formation of peaks B' and B''0 indicating the presence of a flaw. Had a receiver of greater discrimination been used in gathering the data, there would also have been evidence of peak splitting at peak A'. The graphs of FIGS. 36a and 36b also illustrate peak splitting at both A' and B' and B''. The data set forth in Table 1, taken together with the illustrations in FIGS. 34a and 34b, illustrate frequency splitting in response to five different members of family A of banded vibrations.

TABLE 1

Resonance Splitting in Flaw Zone

| Nominal f of Driver | Wavelength | Peak Frequencies Before Flaw | Peak Frequencies After Flaw | $\Delta f$ |
|---|---|---|---|---|
| 45,190 | .94" | A 45,190 | A' 45,125 | −65 |
|  |  | B 45,370 | B' 45,345 | 20 |
|  |  |  | B'' 45,365 |  |
| 47,547 | .91" | A 47,547 | A' 47,500 | −47 |
|  |  | B 47,722 | B' 47,720 | 30 |
|  |  |  | B'' 47,750 |  |
| 49,920 | .88" | A 49,920 | A' not visible | — |
|  |  | B 50,090 | B' 50,090 | 30 |
|  |  |  | B'' 50,120 |  |
| 52,296 | .85" | A 52,296 | A' 52,223 | −73 |
|  |  | B 52,456 | B' 52,418 | 50 |
|  |  |  | B'' 52,468 | evidence of B'' |
| 54,695 | .82" | A 54,695 | A' 54,627 | −68 |
|  |  | B 54,865 | B' 54,807 | 43 |
|  |  |  | B'' 54,850 |  |

FREQUENCY SHIFT FLAW RESPONSE

The final mode of flaw detection to be discussed involves the measurement of the frequency shift of various banded vibrations which may be excited within an object. A given banded vibration has a frequency which is different at different longitudinal positions along the pipe, while the wavelength is constant in the azimuthal direction. A characteristic of the band is that of a sudden increase or decrease in the frequency of the banded vibration with respect to position in response to flaw. This frequency change is associated only with banded vibrations of family A. The banded vibrations of family B maintain constant frequency through zones containing flaws and moderate inhomogeneities.

In response to the gouge flaw, it was found that the frequency of banded vibrations of family A display a downward shift which is both pronounced and accurately associated with the coordinates of the flaw. This shift may be observed in the peaks labeled A and A' in FIGS. 35a and 35b, respectively, and in Table 1.

A second frequency shift related response to be considered as flaw sensitive and also sensitive to size, shape, stress and elastic properties is that of frequency spacings. Other than the the separations discussed under frequency splitting, there are at least three possible indpendent frequency separations which are characterized by:

1. separations between the members of one family;
2. separation between members of different families; and
3. separation between members of fine structure multiplets.

Examination of separations between members of one family for variations with change in longitudinal coordinate, shows that the variation is very small and random for initial separation of about 4 $KH_z$, fluctuations being on the order of $\pm 20$ $H_z$. This individual variation is only of slight significance when it is recalled that the individual members of a pair being compared are showing variations of $\pm 75$ $H_z$ due to the presence of stair-step effect on the pipe, discussed above. The absence of a systematic trend in the intrafamily frequency spacing is a property of both family A and family B and, since the members of family B show substantially no stair-step effect, the variations in the individual frequencies and their spacings are smaller than that of family A. The existence of at least one family of banded vibration which displays immunity in certain responses provides a means of internal continuous calibration of frequency identification of family membership and position within the family, an important feature for automatic flaw finding.

Figure 37:
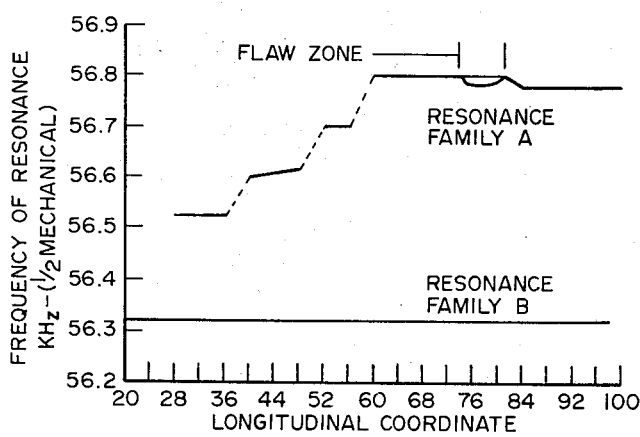
FIG. 37 is a plot of frequency versus longitudinal coordinate of a pipe for two different families of banded vibrations.

The second class of frequency separation is that between members of different families and is particularly useful in distinguishing the type of mechanical change producing any frequency shift as well as being a source of a quantitative measurement, e.g., frequency beats, which are easily synthesized electronically. FIG. 37 is an illustration of a situation wherein a member of family B falls close to a member of family A. The member of family B has essentially constant frequency over all positions on the pipe while the member of family A displays a stair-step phenomena and a splitting near the flaw.

The third class of frequency separation involves the fine structure peaks related to a given banded vibration. The shape of the envelope of peak heights contains information concerning the dynamics of the mechanical system just as the shape of a single peak does. The average position, width, spacing, and decrement are only a few of the derived quantities which are available from a pattern of fine peak structure.

A complex pattern of fine structure peaks may also be treated by the use of intentional amplitude frequency or phase modulation of the exciting signal with the purpose of generating a known side-band pattern. The high quality factor associated with out mechanical banded vibrations is suitable for resolution of closely lying side bands in the drive signals. When the response of the mechanical system is that of many closely spaced resonances, as in fine structure, the combined response of the side band pattern and the pipe is very sensitive to any change in the pipe response.

Figure 38:
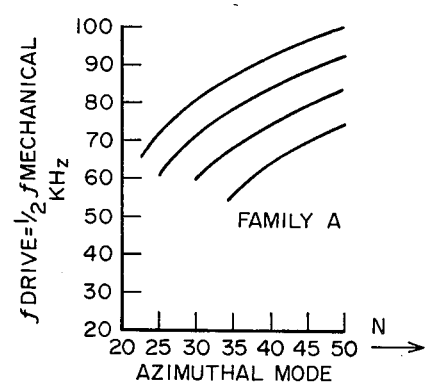
FIG. 38 is a plot of the banded vibration resonance frequency versus azimuthal mode number to illustrate the dependence of the character of family A on pipe wall thickness and on the method of pipe fabrication.
Figure 39:
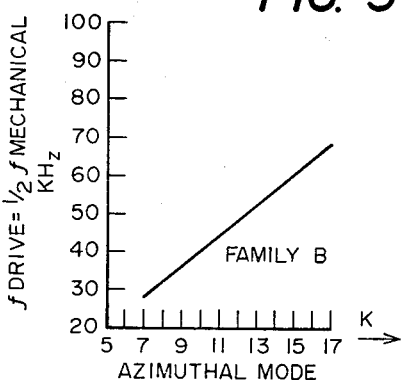
FIG. 39 is a plot of the banded vibration resonance frequency versus the azimuthal mode number which illustrates the lack of depedance on pipe wall thickness and on the method of pipe fabrication for pipes having the same outer circumference.

The above discussion has included a number of references to the two families of resonances which have been investigated in detail with the techniques of the present invention. It is known that for a three-dimensional object obeying a second order differential equation with respect to motion, there should be six independent functions describing the solution. The 6° of freedom in a solution indicate that there should be six independent families of vibration, only two of which have been investigated herein in detail. Azimuthal spatial wavelength and frequency have been chosen as the customary independent variables to identify the banded vibrations along with a quantity derived from spatial wavelength and a cross-sectional dimension of the elongated object termed the azimuthal mode number. FIG. 38 illustrates the frequency-azimuthal mode number relation for banded vibrations of family A. FIG. 39 illustrates the frequency-azimuthal mode number for banded vibrations of family B. From observation of these graphs, the following differences between the families include:

1. family B occurs at a considerably higher frequency than family A for a given mode number;
2. family B appears insensitive to the pipe wall thickness and constructions;
3. family B falls along a straight line; and
4. family A is responsive to wall thickness and to the type of construction of the pipe and lies along a line of decreasing slope for increasing mode number.

Empirical formulas have been developed for the relationship of frequency to azimuthal mode. For family B, the formula is simply that of a straight line:

$$f = AK + C;$$

wherein $A$ and $C$ are empirical parameters, functions of mechanical conditions of the pipe and $K$ is an integer representing the azimuthal mode. The empirically derived parameters for an 8 inch diameter pipe are $A = 3950$ $H_z$ per mode and $C$ is approximately equal to 500 $H_z$.

The empirical equation developed for family A is of the form:

$$f = AN^{3/2} + BN^{5/2} + C;$$

wherein $A$, $B$ and $C$ are empirical parameters and functions of the mechanical condition of the pipe; and $N$ equals an integer representing the azimuthal mode. Values of $A$ for an 8 inch diameter pipe are on the order of 300 $H_z$ per (mode)$^{3/2}$, while values of B are on the order of $-0.8$ $H_z$ per (mode)$^{5/2}$ and C equals $-3000$ $H_z$. These values give a very high degree of correlation of the formulas to experimental data. The mean deviation between the empirical curve and the data points is less than 0.1% over more than one octave.

As discussed above, separation of the driver and receiver is of significant assistance in further defining the zone of sensitivity. Certain flaw responses, e.g., peak splitting and frequency splitting are sensitively related to the driver-flaw longitudinal separation. Moreover, the onset of splitting is an excellent indication of the true driver position with respect to the flaw. Because of the strong decrease of vibration amplitude away from the driver coordinate, the zone on the side of the driver away from the receiver has less influence on the signal as received than that portion of the zone of sensitivity between the driver and receiver, thereby reducing the effect of near zone influences. It has been found that reversing the driver and receiver positions duplicates the data for the pipe section between them.

SYSTEM OPERATION

Figure 40:
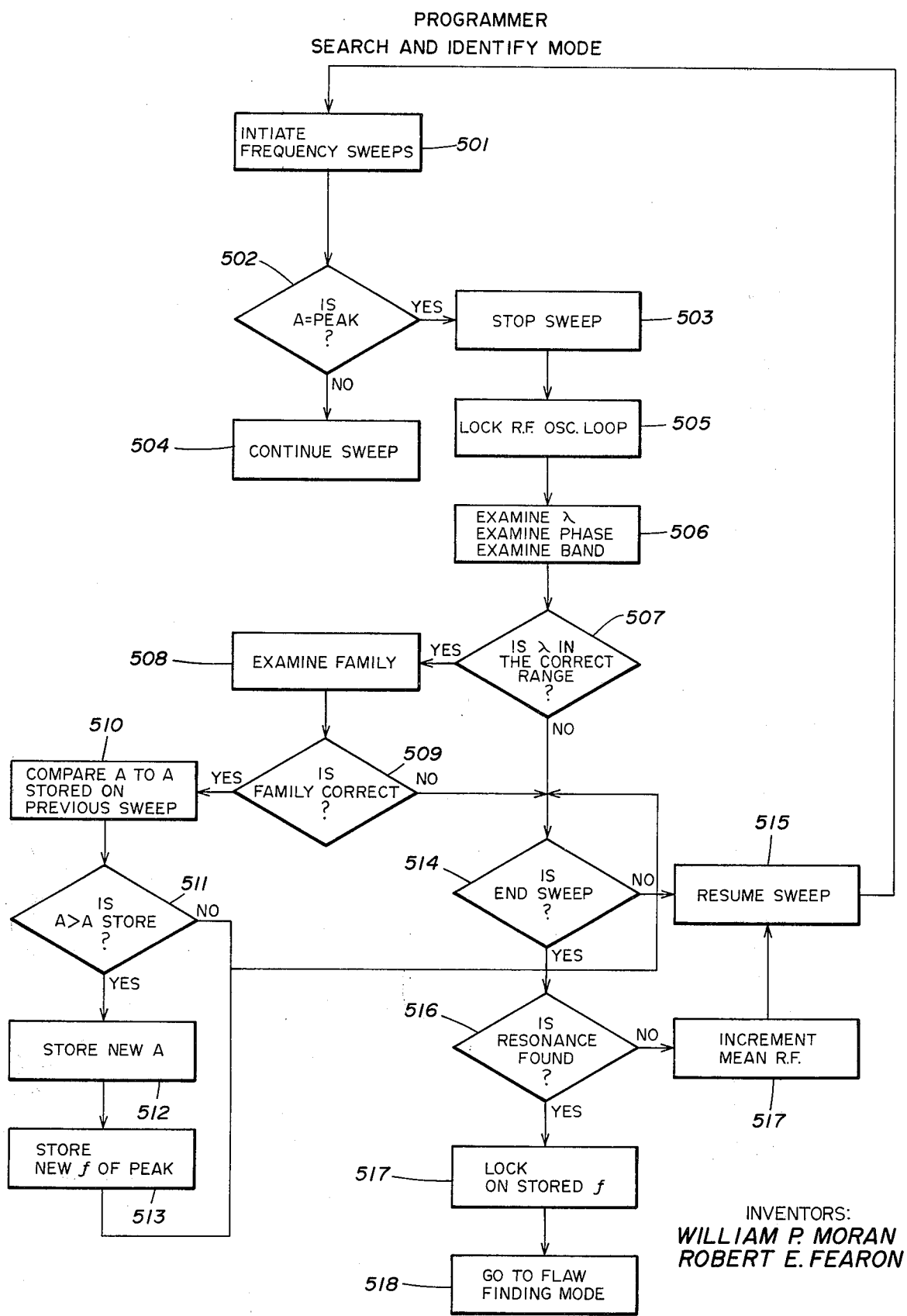
FIG. 40 is an operational flow chart of the system of the invention in a search and identify mode.

Having described the structure of one embodiment of the invention and the manner in which tests are performed on elongate structures, the specific manner in which the equipment is operated to search out and identify a mode of banded vibration and then search for flaws will now be discussed. Referring to FIG. 40, there is shown a flow diagram illustrating the functions which are performed while the pig is in the search and identify mode to locate a mode of banded vibration for flaw finding. The process begins by sweeping the frequency of the driver through a pre-selected range at 501. If an amplitude peak is detected at 502, then the sweep is stopped at 503. As long as no amplitude peak is detected, sweeping of the frequency through the range continues at 504.

When sweep is interrupted due to detection of an amplitude peak, the RF oscillator loop is locked upon the frequency at which a peak was detected at 505. At 506, the wavelength, phase and band of the signal being detected by the leading, trailing and midsection receivers are examined. The phase and wavelengths are inspected by looking at the signals received by two midplane receivers which are located at the same longitudinal point but at different azimuthal coordinates. The phase and wavelength of the received signals from the two receivers is compared to a pre-set phase and wavelength which would correspond to that of a banded vibration of a given family. The particular band of oscillation is inspected by looking at the amplitude of the forward and rear receivers to determine whether the received amplitude is larger or smaller than that of the central receivers to indicate that there is a banded region in the area of the midsection receivers. If the wavelength is determined to be in the correct range at 507, then the family of vibrations is examined at 508 by employing two receivers which are sensitive to two different types of polarization. As was pointed out above, it has been found that polarization of particle motion either inward and outward of the surface of an object or parallel to the surface is indicative of the family.

If the family of vibrations is found to be correct at 509, then the amplitude of the vibration is compared to the amplitude of the previous relative maximum of the received signal. If the present amplitude is greater than that previously stored at 511, then the new amplitude is stored at 512 and the new frequency stored at 513. If either the family was found to be incorrect at 509 or the amplitude found to be less than that of the stored value at 511, then whether or not the sweep has reached the end of its frequency range it is examined at 514. If no, then RF sweeping is resumed at 515 and the cycle is repeated at location 501. If the end of the sweep range has been reached and no resonance has been found at 516, then the mean RF about which the driver has been swepth is incremented at 517 and sweeping is resumed. If a banded resonance has been found then the system is locked onto the banded frequency at 517, and the decision made at 518 to proceed to the flaw finding mode.

Once a banded resonant condition has been located and locked in, the process illustrated in the flow diagram of FIG. 41 is initiated to begin the inspection of the object in question for the existence of flaws. Steps 520, 521 and 522 illustrate portions of the search and identify mode described above in connection with FIG. 40. The front, rear and two midsection receivers are simultaneously activated as represented by 521 and the peak amplitude located in the search and identify mode was temporarily stored from the forward receiver. The phase of resonance was stored at 522. Periodically as set by a programmer and the pig speed indicator, the drive signal is frequency modulated at 523 with a constant modulation index and a varying side band spacing technique. The peak number, spacing and resonance width from all receivers is stored at 524. The storage of received amplitude and phase is gated off during the side band frequency sweeps to block out the amplitude tests during the frequency tests at 525.

As the pig is moved down the length of a pipe, a test is made at 526 as to whether the change in the amplitude of the received signal with change in coordinate is either zero, positive or negative. Similarly, at 527 a test is made as to whether the change of phase of the signal, as received by the forward receiver, is either positive, negative, or zero. If neither amplitude nor phase is changing as the pig is moved down the length of the pipe, periodic frequency modulation sweeps are continued in search of flaws at 528. If amplitude or phase are changing negatively with increase in coordinate, then a routing is initiated to analyze as to whether the change is caused by stair-step effect or the crossing of a joint in the pipe at 529. If the change in amplitude or phase with coordinate is positive, then the system enters a routine for processing for flaws as indicated at 530 which is further described in more detail in the flow diagram of FIG. 42.

As illustrated in FIG. 42, the position and value of a maximum resonance amplitude are permanently recorded at 540 while the position and value of a maximum in resonance phase are recorded at 541. At 542, redundant testing is performed by initiating the opening of a delayed gate for signal processing by the trailing receiver under a timing control of the pig speed indicator. As the region of the driver approaches the flaw responsible for amplitude and phase peaks, frequency modulation with constant modulation index is initiated with detection by the forward receiver. At 544, the received signal is processed for peaks which were not present during the immediately preceding regularly programmed sweep. The number, spacing and location of surplus peaks indicative of flaws is stored at 545. At 546, the data processing by the forward receiver is terminated and processing initiated at the midsection receivers. The frequency modulation sweep is initiated with reception by the midsection receivers at 547 and the frequency, number and spacing of detected peaks is compared to that received on the previous regularly programmed frequency sweep at 548. At 549, any frequency shitt and/or the frequency difference due to splitting is stored. The resonance bandwidth is compared to the previously stored value at 550 and if the bandwidth is the same, as determined at 551, then all the recorded data are permanently stored at 552. If, however, the resonance bandwidth is determined to be different from that previously stored, then the width and asymmetry data are stored at 553 prior to permanently storing all of the recorded data and returning to the flaw finding mode at 552.

It is to be understood that the flow diagrams shown in FIGS. 40, 41 and 42 are simply illustrative of possible modes of operation in locating banded vibrations and performing the tests required to locate flaws in an object. Many other permutations and additional tasks could be incorporated into the procedures set forth in the flow diagrams if so desired. For example, one additional flaw detection test can be employed is that of exciting a banded vibration and then suddenly interrupting the driving excitation. The length of time required for induced vibrations to dissipate has been found indicative of the presence of a flaw within the banded zone.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for inspecting a sound conducting body having at least one acoustic path, where the body has length normal to said path, comprising:
   a carrier adapted for movement along the length of the body to be inspected in a direction normal to the acoustic path,
   means mounted upon said carrier for applying mechanical energy to said body along said path at a frequency to establish acoustic vibrations propagating in a direction along said path and evanescent vibrations in a direction normal to said path, said energy applied for a period substantially greater than the propagation period for said waves over the length of said path in the body to be inspected,
   means mounted upon said carrier for detecting a vibration wave of said body, and
   means responsive to said detecting means for producing a signal indicative of a flaw within the path region of said body.

2. A system for inspecting a sound conducting body as set forth in claim 1, wherein said signal producing means also includes:
   means for generating a signal indicative of the size and type of flaw present.

3. A system for inspecting a sound conducting body having at least one acoustic path, where the body has length normal to said path, comprising:
   a carrier adapted for movement along the length of the body to be inspected;
   means mounted upon said carrier for generating an acoustic banded vibration within the acoustic path of said body;
   means mounted upon said carrier for detecting a vibration wave of said body; and
   means responsive to said detecting means for producing a signal indicative of a physical characteristic of the acoustic path of said body.

4. A system for inspecting a sound conducting body as set forth in claim 3 wherein said signal producing means generates a signal indicative of the size and shape of a flaw within the acoustic path of said body.

5. A system for inspecting a sound conducting body as set forth in claim 3 wherein said signal producing means generates a signal indicative of the presence of joints and seams within the acoustic path of said body.

6. A system for inspecting a sound conducting body as set forth in claim 3 wherein said signal producing means generates a signal indicative of the condition of the interface between the acoustic path of said body and its environment.

7. A system for inspecting a sound conducting body as set forth in claim 3, wherein:
   said means for generating a banded vibration includes a radio frequency generator, a power amplifier connected to the generator, and a transducer connected to the output of the amplifier and positioned adjacent the surface of said body for converting electrical energy from the amplifier into mechanical energy and coupling the mechanical energy into the acoustic path of said body; and
   said means for detecting a vibratioon wave includes a transducer positioned adjacent the surface of said body for converting mechanical vibrations adjacent said transducer into electrical signals and a transducer amplifier connected to the output of the transducer for amplifying the signals; and
   said signal producing means includes means for analyzing the output of said transducer amplifier for signal parameters indicative of physical characteristics of said body.

8. A system for inspecting a sound conducting body as set forth in claim 7, wherein:
   said analyzing means includes means for producing an indication of flaws in said body.

9. A system for inspecting a sound conducting body as set forth in claim 7, wherein:
   said analyzing means includes means for producing an indication of the size and shape of said body.

10. A system for inspecting a sound conducting body as set forth in claim 7, wherein:
    said analyzing means includes means for producing an indication of the ultimate strength and elastic and plastic characteristics of said body.

11. A system for inspecting a sound conducting body as set forth in claim 7, wherein:
    said analyzing means includes means for producing an indication of the stress conditions within said body.

12. A system for inspecting a sound conducting body as set forth in claim 7, wherein:
    said means for detecting a vibration wave is positioned adjacent a point spaced from the transducer of said means for generating a vibration wave and at a location wherein the amplitude of the vibrations of said body are less than a preselected value; and
    said analyzing means includes means for detecting a signal differing in phase, frequency, or amplitude from the signal expected on the basis of the character of the object and the impressed signal.

13. A system for inspecting a sound conducting body for flaws as set forth in claim 7, wherein:
    said vibration generating means being mounted near the center of said carrier;
    said means for generating a banded vibration includes at least three transducers, the first of said transducers being mounted near the front of said carrier, the second near the center of said carrier and the third near the rear, said transducers also lying along the straight line parallel to the direction of adapted movement of said carrier; and
    wherein said analyzing means includes means for comparing the relative phases, with respect to the said means for generating a banded vibration, of said first and second transducers with said second and third transducers to produce a signal indicative of physical characteristics of said body.

14. A system for inspecting a sound conducting body having at least one acoustic path, where the body has length normal to said path, comprising:
- a carrier adapted for movement along the length of the body to be inspected;
- means mounted upon said carrier for generating an acoustic banded vibration within the acoustic path of said body;
- means mounted upon said carrier for detecting a vibration wave of said body; and
- means responsive to said detecting means for producing a signal indicative of the first and higher order elastic parameters of the acoustic path of said body.

15. A system for inspecting a sound conducting body having at least one acustic path, where the body has length normal to said path, comprising:
- a carrier adapted for movement along the length of the body to be inspected;
- means mounted upon said carrier for generating an acoustic banded vibration within the acoustic path of said body;
- means mounted upon said carrier for detecting a vibration wave of said body; and
- means responsive to said detecting means for producing a signal indicative of the stresses within the acoustic path of said body.

16. A pipeline inspection system for the location of flaws which comprises:
- search means movable through said pipe;
- an acoustic transmitter in said search means for applying mechanical energy to said pipe wall at at least one point at a frequency corresponding with at least one banded resonance frequency for a path normal to the length of said pipe and for a period substantially greater than the propagation time of acoustic energy, the length of said path to establish a resonant condition in said pipe of banded vibration nodes and anti-nodes which occur along said path and extend lengthwise of said pipe with little lengthwise energy propagation; and
- means for sensing the acoustic energy in said pipe resulting from energy flow along said path.

17. A pipeline inspection system for location of flaws as set forth in claim 16 wherein said sensing means includes:
- a plurality of receivers spaced from one another mounted within said search means; and
- means for selectiively utilizing one or more of said receivers.

18. A pig for the inspection of pipe comprising:
- a cylindrical body having wheels mounted upon the outer surface thereof to permit movement through a pipe to be inspected;
- a driver transducer mounted within said body for coupling vibrational energy into the wall of the pipe;
- a receiver transducer mounted within said body and spaced along the longitudinal axis of the pig for detecting vibration of the wall of the pipe;
- means connected to said driver transducer for energizing said transducer to produce a banded vibration extending around the circumference of the pipe and over a localized region in the longitudinal direction; and
- means responsive to the output of said receiver transducer for producing a signal indicative of physical characteristics of said localized region of pipe under inspection.

19. A method of using acoustic vibrations to mechanically inspect a sound conducting body, having at least one acoustic ray path closed upon itself, where the body has length normal to said path which comprises:
- applying forces to one or more zones of the body along or adjacent to said path,
- exciting propagating acoustic vibrations in a direction along said path and evanescent acoustic vibrations in a direction normal to said path,
- repeatedly passing the propagating vibration through the zones of applied force,
- adjusting the magnitude, number, shape, position, frequency and phasing of the applied force at the zones of application to generate a banded vibration along said path, and
- sensing the banded vibration of said body at one or more points in the region occupied by the banded vibration.

20. A method of using acoustic vibrations to mechanically inspect a sound conducting body as set forth in claim 19 wherein the step of sensing the banded vibration includes measuring the deviations of the shape of the banded vibration amplitude distribution at points away from the closed acoustic ray path from the shape of the banded vibrations established at the zones of excitation, and generating a signal indicative of a flaw in the body in the region of the vibration amplitude distribution deviation.

21. A method of using acoustic vibrations to mechanically inspect a sound conducting body as set forth in claim 19 wherein the step of sensing the banded vibration of said body includes measuring the presence of a second banded vibration on a closed acoustic ray path adjacent to the closed acoustic ray path and measuring the banded vibration being excited, and generating a signal indicating the presence of a flaw in the region occupied by the second banded vibration.

22. A method of using acoustic vibrations to mechanically inspect a sound conducting body as set forth in claim 19 wherein the step of sensing the banded vibration of said body includes measuring the variation of the shape of the phase distribution as a function of a distance normal to the closed acoustic ray path from the shape of the phase distribution characteristic of the banded vibration established at the zones of excitation, and generating a signal indicative of the shape deviation to indicate a flaw in said body in the region of the deviation.

23. A method of using acoustic vibrations to mechanically inspect a sound conducting body as set forth in claim 19 wherein the step of applying forces to one or more zones of the body includes applying an exciting force at substantially one frequency for a period of time greater than ten times the propagation time through the closed acoustic ray path.

24. A method of using acoustic vibrations to mechanically inspect a sound conducting body as set forth in claim 19 wherein the frequency of the applied forces achieves resonance for propagation along the closed acoustic ray path and bandedness in directions normal to the closed acoustic ray path.

25. A method of using acoustic vibrations to mechanically inspect a sound conducting body as set forth in claim 19 wherein the step of applying forces to one or more zones of the body includes applying exciting forces at a number of discrete frequencies applied for a period of time greater than ten times the propagation time through the closed acoustic ray path.

26. A method of using acoustic vibrations to mechanically inspect a sound conducting body as set forth in claim 25 wherein the discrete frequencies are selected to achieve resonance for propagation along the closed acoustic ray path and bandedness in directions normal to the closed acoustic ray path.

27. A method of using acoustic vibrations to mechanically inspect a sound conducting body, having at least one acoustic ray path closed upon itself, where the body has length normal to said path which comprises:
applying forces to one or more zones of the body along or adjacent to said path,
exciting propagating acoustic vibrations in a direction along said path and evanescent acoustic vibrations in a direction normal to said path,
repeatedly passing the propagating vibrations through the zones of applied force,
adjusting the parameters of the applied force at the zones of application to generate a banded vibration along said path, and
sensing the banded vibrations of said body at one or more points in the region occupied by the banded vibrations.

28. A method of using acoustic vibrations to mechanically inspect a sound conducting body, having at least one acoustic ray path closed upon itself, where the body has length normal to said path, comprising:
a. applying forces to one or more zones of the body along or adjacent to said path,
b. exciting propagating acoustic vibrations in a direction along said path and evanescent acoustic vibrations in a direction normal to said path,
c. repeatedly passing the propagating vibrations through the zones of applied force,
d. adjusting the parameters of the applied force at the zones of application to generate a banded vibration along said path,
e. repeating steps (a)–(d) to generate additional banded vibration along closed acoustic ray paths,
f. sensing each of the banded vibrations of said body at one or more points in the region occupied by the banded vibration, and
g. generating a signal related to the differences between the frequency and wavelength of the various banded vibrations as an indication of the size and shape of the object in the region of the banded vibration.

29. A method of using acoustic waves to mechanically inspect a sound conducting body as set forth in claim 28, wherein
said generated signals are indicative of the size and shape of said body position.

30. A method of using acoustic waves to mechanically inspect a sound conducting body as set forth in claim 28, wherein:
said generated signals are indicative of the presence of joints and seams within said body portion.

31. A method of using acoustic waves to mechanically inspect a sound conducting body as set forth in claim 28, wherein:
said generated signals are indicative of the condition of the interface between said body portion and its environment.

32. A method of using acoustic vibrations to mechanically inspect a sound conducting body as set forth in claim 28 wherein each of the banded vibrations is excited successively and the generated signal indicates the elastic constants of the body, its state of stress and strain, and the condition of the interface between the body and the surrounding environment.

33. A method of using acoustic vibrations to mechanically inspect a sound conducting body as set forth in claim 28 wherein the banded vibrations are excited simultaneously and the generated signal indicates the elastic constants of the body, its state of stress and strain, and the condition of the interface between the object and surrounding environment.

34. A method of using acoustic vibrations to mechanically inspect a sound conducting body, having at least one acoustic ray path closed upon itself, where the body has length normal to said path, which comprises:
applying forces to one or more zones of the body along or adjacent to said path,
exciting propagating acoustic vibrations in a direction along said path and evanescent acoustic vibrations in a direction normal to said path,
repeatedly passing the propagating vibrations through the zones of applied force,
sweeping the frequency of the applied forces to produce a banded vibration resonance on the closed acoustic ray path, and
measuring the vibration amplitude of the banded vibration resonance as a function of distance normal to said path,
sensing the presence of a second banded vibration resonance on an adjacent closed acoustic ray path at a frequency different from the frequency of the excited banded vibration resonance, and
generating a signal indicating a flaw in the body in the region of the second banded vibration.

35. A method of using acoustic vibrations to mechanically inspect a sound conducting body, having at least one acoustic ray path closed upon itself, where the body has length normal to said path, which comprises:
applying forces to one or more zones of the body along or adjacent to said path,
exciting propagating acoustic vibrations in a direction along said path and evanescent acoustic vibrations in a direction normal to said path,
repeatedly passing the propagating vibrations through the zones, of applied force,
sweeping the frequency of the applied force to produce a banded vibration on the closed acoustic ray path, and
recording the number of banded vibrations with resonances for the swep frequencies and generating a signal indicative of changes in the number of banded vibration resonances in the interval of the swept frequencies as an indication of a flaw in the region of the change.

* * * * *